United States Patent [19]
Yajima et al.

[11] Patent Number: 5,909,944
[45] Date of Patent: *Jun. 8, 1999

[54] PROJECTION-TYPE DISPLAY APPARATUS

[75] Inventors: Akitaka Yajima; Motoyuki Fujimori; Mutsuya Furuhata; Tomiyoshi Ushiyama; Terunaga Koide; Toshiaki Hashizume; Kiyoshi Miyashita; Hiroshi Harima; Keijiro Naito, all of Suwa, Japan

[73] Assignee: Seiko Epson Corporation, Tokyo, Japan

[ * ] Notice: This patent is subject to a terminal disclaimer.

[21] Appl. No.: 09/034,599

[22] Filed: Mar. 3, 1998

Related U.S. Application Data

[62] Division of application No. 08/697,707, Aug. 27, 1996, Pat. No. 5,743,610, which is a continuation of application No. PCT/JP95/02695, Dec. 26, 1995.

[30] Foreign Application Priority Data

| Dec. 27, 1994 | [JP] | Japan | 6-326492 |
|---|---|---|---|
| Dec. 27, 1994 | [JP] | Japan | 6-326493 |
| Dec. 27, 1994 | [JP] | Japan | 6-326494 |
| Dec. 27, 1994 | [JP] | Japan | 6-326497 |
| Dec. 27, 1994 | [JP] | Japan | 6-326498 |

[51] Int. Cl.$^6$ ................................................. G03B 21/14
[52] U.S. Cl. ............................ 353/81; 353/33; 359/831
[58] Field of Search .................... 353/33, 81, 31, 353/34, 37; 359/831, 833, 834, 837

[56] References Cited

U.S. PATENT DOCUMENTS 4,904,061  2/1990  Aruga .
5,098,183  3/1992  Sonehara .

(List continued on next page.)

FOREIGN PATENT DOCUMENTS 0 537 708  4/1993  European Pat. Off. .
0 646 828  4/1995  European Pat. Off. .

(List continued on next page.)

Primary Examiner—William Dowling
Attorney, Agent, or Firm—Mark P. Watson

[57] ABSTRACT

A projection-type display apparatus in which the entry of light rays to the back side of liquid crystal light valves from dichroic prism that composes optical system light synthesizer is prevented. To this end, a projection display according to the present invention preferably includes a color synthesizer for combining colored and modulated light beams, comprising: a square column dichroic prism composed of four triangle prisms having equal refractive index together whose cross sections are right isosceles triangles such that three light valves are located adjacent to three exterior peripheral surfaces of dichroic prism to receive colored and modulated light beams therefrom and; a filter for absorbing light with a specified wavelength range, leaked from surface of dichroic prism at the opposite side of incident light surface and directed to liquid crystal light valve, the filter being located between liquid crystal light valves and surface of dichroic prism. As for construction of the dichroic prism itself, specifically, of the four aforementioned triangular prisms, the first triangular prism and the aforementioned third triangular prism are mutually affixed in a condition in which there is a first step difference in the vertical direction. The first exposed side is formed on one edge of the affixed side of the first triangular prism. Similarly, the second triangular prism and the fourth triangular prism are attached to each other such that there is a second step difference on the same edge, and a second exposed side is formed on one edge of the affixed surface of the second triangular prism. Further, the first and the third triangular prisms and the second and the fourth triangular prisms are attached, with a step difference between them, in such a way that the aforementioned first exposed side and the aforementioned second exposed side are located on the edges facing the same direction; and a third exposed surface that is orthogonal to the aforementioned first and second exposed surfaces is formed between the aforementioned first triangular prism and the aforementioned second triangular prism.

4 Claims, 19 Drawing Sheets

FOREIGN PATENT DOCUMENTS

| | | |
|---|---|---|
| 39-20049 | 9/1964 | Japan . |
| 53-106147 | 9/1978 | Japan . |
| 61-102626 | 5/1986 | Japan . |
| 62-1391 | 1/1987 | Japan . |
| 62-145218 | 6/1987 | Japan . |
| 63-121821 | 5/1988 | Japan . |
| 64-32289 | 2/1989 | Japan . |
| 3-233553 | 10/1991 | Japan . |
| 4-62540 | 2/1992 | Japan . |
| 6-258636 | 9/1994 | Japan . |
| 6-331983 | 12/1994 | Japan . |
| 07294845 | 11/1995 | Japan . |

U.S. PATENT DOCUMENTS

| | | | |
|---|---|---|---|
| 5,135,300 | 8/1992 | Toide et al. . | |
| 5,221,998 | 6/1993 | Sugahara . | |
| 5,515,202 | 5/1996 | Wright . | |
| 5,653,520 | 8/1997 | Kato | 353/33 |
| 5,743,610 | 4/1998 | Yajima et al. | 353/81 |

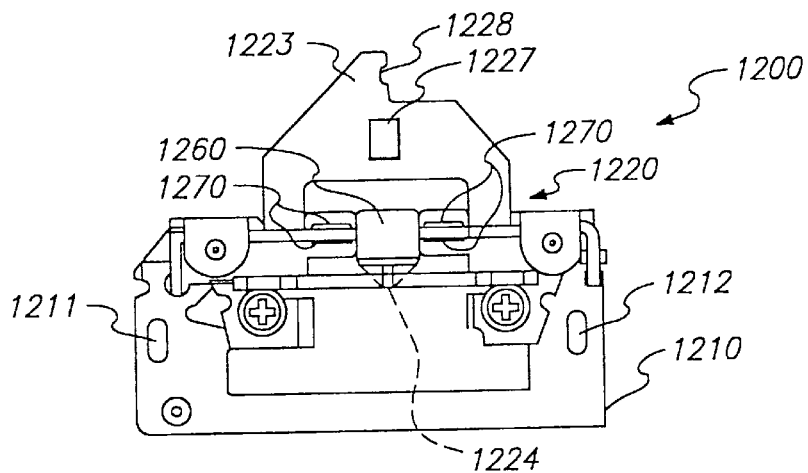
FIG.-5A
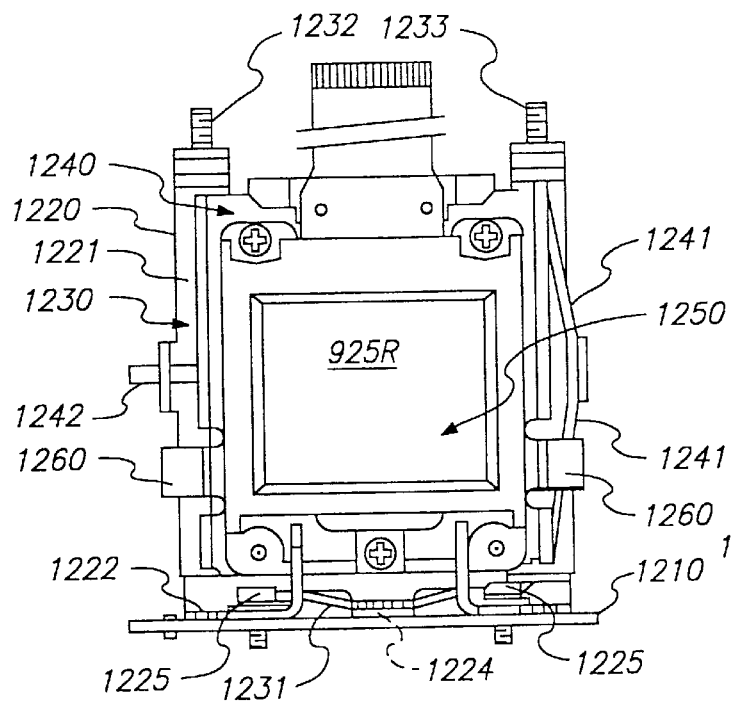 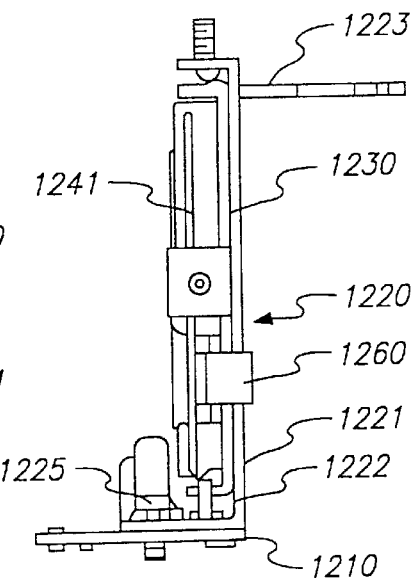
FIG.-5B  FIG.-5C

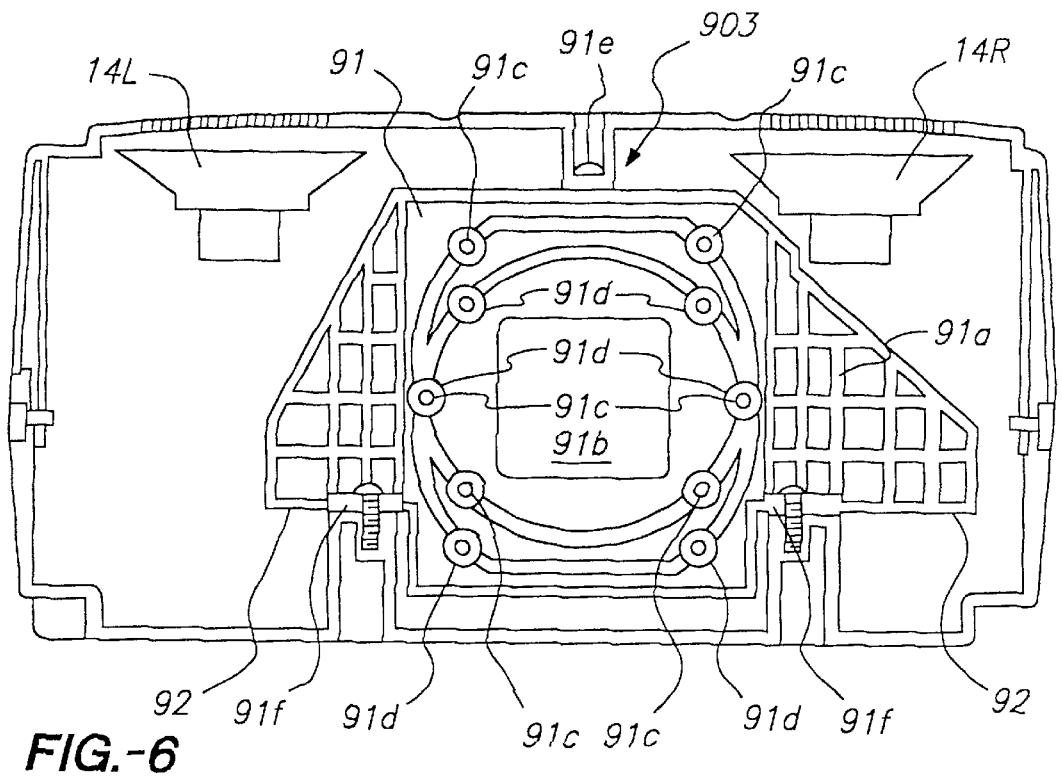
FIG.-6
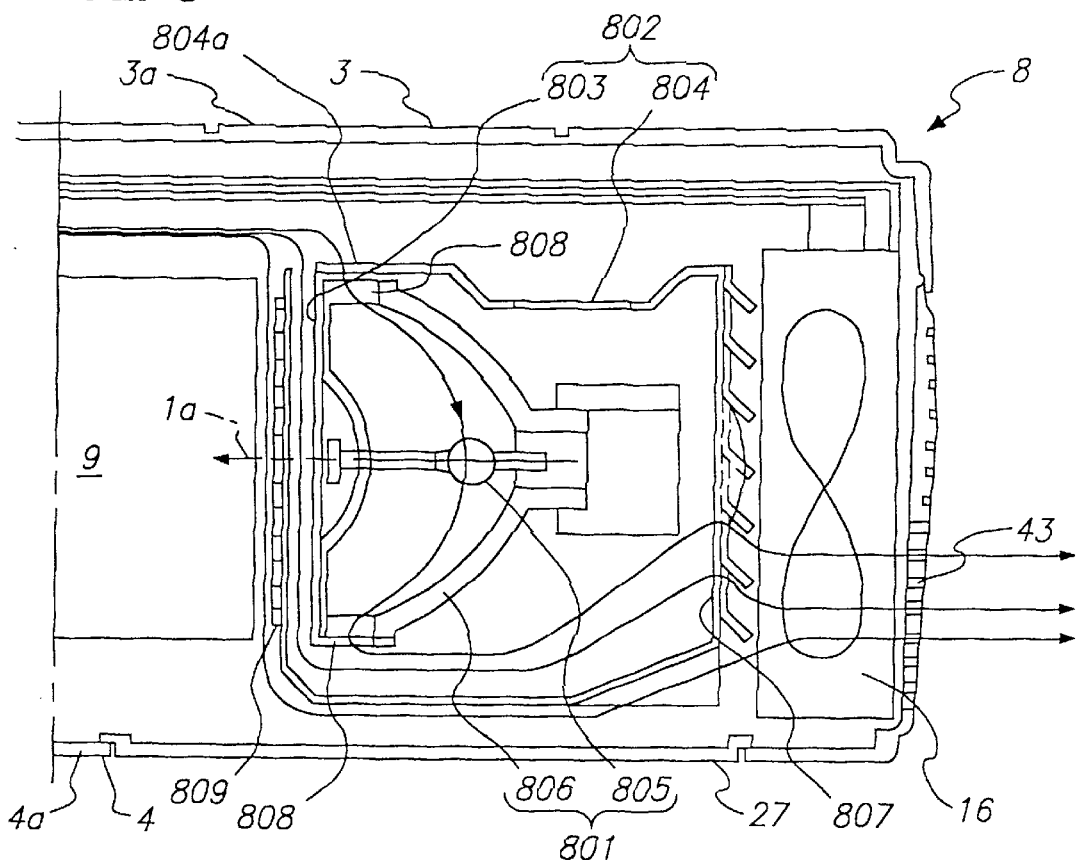
FIG.-7  (B-B CROSS SECTION)

(E-E CROSS SECTION)

(F-F CROSS SECTION)

(H-H CROSS SECTION)

(K-K CROSS SECTION)

(J-J CROSS SECTION)

(I-I CROSS SECTION)

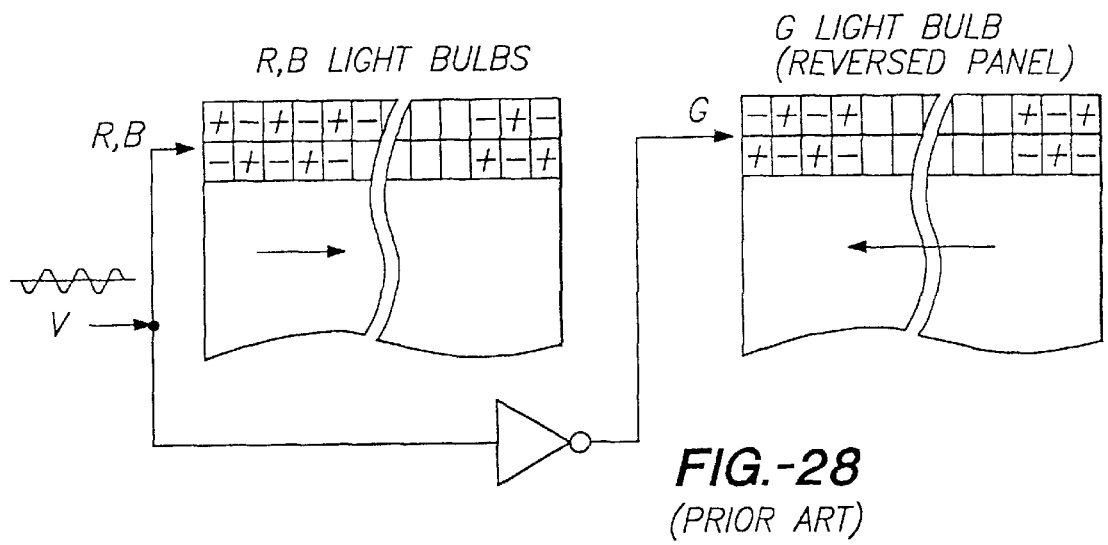
FIG.-28
(PRIOR ART)
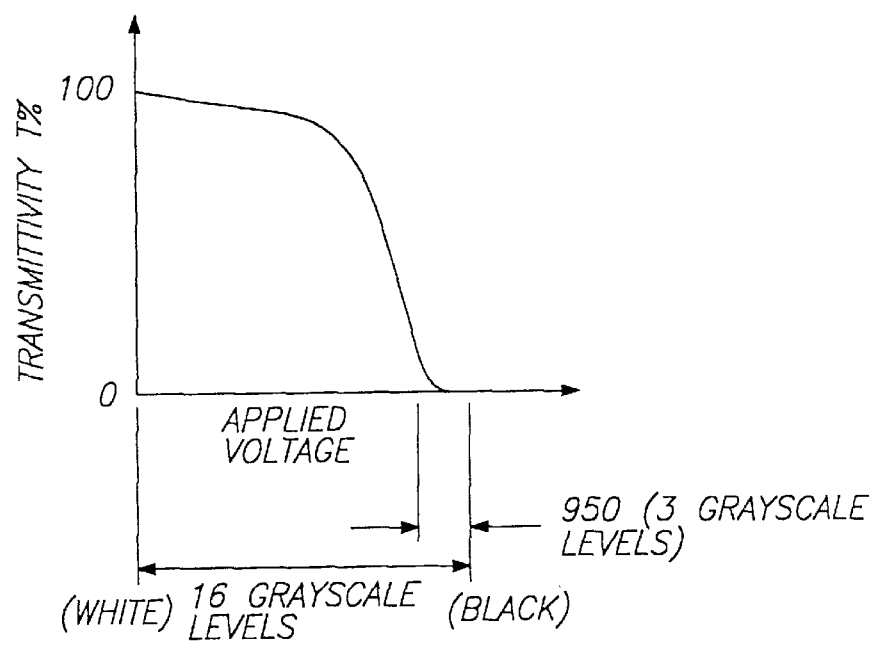
FIG.-29
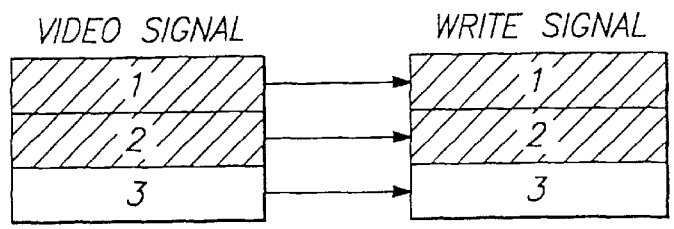
FIG.-30A FULL-LINE DRIVING

DOUBLE-SCAN DRIVING

WRITING TO ODD-NUMBERED FIELDS

WRITING TO EVEN-NUMBERED FIELDS

PROJECTION-TYPE DISPLAY APPARATUS

RELATED APPLICATIONS

This application is a divisional of Ser. No. 08/697,707 filed Aug. 27, 1996, and now U.S. Pat. No. 5,743,610, which is incorporated herein by reference, and which is a continuation of PCT international application PCT/JP95/02695, filed Dec. 26, 1995, designating the United States. This application is also related to U.S. application Ser. No. 08/708,139, entitled "PROJECTION-TYPE DISPLAY APPARATUS", attorney's docket No. P2238b, filed on the same day as application Ser. No. 08/697,707 and commonly assigned to the Seiko Epson Corporation of Tokyo, Japan.

BACKGROUND OF THE INVENTION

1. Field of Invention

This invention relates to a projection-type display apparatus enlarging and projecting color light image onto a screen through a projection lens by decomposing the white light beam from a light source into three-color light beams of red, blue, and green, modulating these colored light beams through a light valves comprising liquid crystal panels according to given video information and recombining the modulated light beams of different colors after modulation. More specifically, the present invention relates to a structure for preventing light cross talking on the dichroic prism that comprises the light synthesizer in the optical system for such a projection-type display apparatus. The invention also relates to a dichroic prism structure for accurate assembling.

2. Description of the Related Art

Fundamentally, a projection-type display apparatus comprises a light source a color separator segregating white light beam emitted from a light source into three primary color light beams, three liquid crystal light valves modulating three color light beams, a light synthesizer synthesizing modulated color light beams and a projection lens enlarging and projecting synthesized, modulated light beam onto a screen.

As color synthesizer, the dichroic prism is a well-known. For embodiment, the structure of a dichroic prism was disclosed in laid-open Japanese patent applications S39-20049 and S62-1391 by the present applicants. As described in these publications, the dichroic prism is composed of four triangle prisms of the same shape that are affixed together. On the X-shaped fixing surface, a dielectric film reflector surface is formed that has the ability selectively to reflect a given color. However, there are several notable problems in the manufacture of such prisms, as will be discussed below.

First, as indicated in FIG. 24, the modulated colored light beams that have passed through liquid crystal light valves 925 R, G, and B and that pass through prism unit 910, are reflected by its X-shaped reflecting surfaces (9100R, 9101R, 9100B, 9101B), and are emitted to the side of projection liens unit 6. A small amount of light, however, fails to be reflected by the X-shaped reflecting surface; it passes through the reflecting surface and sometimes reaches the backside of the liquid crystal light valve that is located across prism unit 910. For example, the blue modulated light beam may occasionally pass through blue reflecting surfaces 9100B and 9101B, exit from the incident surface 910R for the red light beam, and reach here from the backside of red liquid crystal light valve 925R. Conversely, the red modulated light beam may sometimes pass through red reflecting surfaces 9100R and 9101R, and reach here from the incident surface 910B for the blue light beam and from the back side of blue liquid crystal light valve 925B. Moreover, the green modulated light beam may sometimes be reflected to the side of red liquid crystal light valve 925R instead of passing through prism unit 910. Light striking the backside of liquid crystal light valve 925R in this manner could have a deleterious effect, such as causing a malfunction of the liquid crystal panel. Blue light with a short wavelength can have a particularly significant influence in this regard.

Secondly, if these four prisms are not precisely aligned in a dichroic prism that is used as a color synthesizer in a projection-type display apparatus, the images formed by the different colors synthesized through the dichroic prism thus obtained may become misaligned on the screen, thus resulting in poor image quality. For example, as shown in FIG. 20, such a problem arises when bumps exist between fixed surfaces. The following conventional method has been proposed to fix prisms accurately: for example, as shown in FIG. 21, a pair of prisms 910a and 910b from the four prisms 910a, 910b, 910c, and 910d are fixed with a step difference between them; the remaining pair of prisms, 910c and 910d, are likewise fixed with a step difference between them. After that, step difference surfaces 910e and 910f are used as positional alignment surfaces in order to affix the pairs of prisms. This method is described in Japanese application S39-20049 referenced above.

Although this method works well for positionally aligning prisms in one direction, however, it cannot align prisms in the orthogonal direction thereto. Specifically, when four prisms are fixed, the center of the X-shaped fixation surface cannot be determined accurately.

SUMMARY OF THE INVENTION

It is therefore an object of the present invention to propose a projection-type display apparatus equipped with an optical system capable of addressing and rectifying eliminating these problems.

To address the first problem mentioned above, the projection-type display apparatus of the present invention includes the following:

A projection-type display apparatus, comprising: a light source; a color separator for separating white light beam emitted from light source into colored light beams of three primary colors; three liquid crystal light valves for modulating separated and colored light beams according to a given video signal;

a color synthesizer for combining said colored and modulated light beams, comprising:

a square column dichroic prism composed of four triangle prisms having equal refractive index together whose cross sections are right isosceles triangles such that three light valves are located adjacent to three exterior peripheral surfaces of dichroic prism to receive colored and modulated light beams from light valves;

a filter for absorbing light with a specified wavelength range, leaked from surface of dichroic prism at the opposite side of incident light surface and directed to liquid crystal light valve, being located between liquid crystal light valves and surface of dichroic prism; and projection lens for enlarging and projecting synthesized, modulated light beam onto a screen.

In this case, it is desirable that the outer periphery sides located across dichroic prism are, respectively, the incident surfaces for the red and blue light beams and the aforementioned filter for absorbing at least the light of the blue wavelength should be provided between the red light beam incident surface among these incident surfaces and the aforementioned liquid crystal light valve located across the incident surface.

Likewise, the aforementioned filter that absorbs at least the light of the red wavelength should be provided between the blue light beam incident surface and the aforementioned liquid crystal light valve that is located across the incident surface.

Furthermore, the aforementioned color separator preferably should be provided with a color separation improvement means that improves the color separation property of the dichroic prism by aligning the light beams of different colors with a specified polarized light.

In this manner the light that has passed through the X-shaped reflecting surface of the dichroic prism instead of being reflected by the reflecting surface in the outlet direction, or the light that is reflected by the X-shaped reflecting surface when it should have propagated to the outlet side by passing through the X-shaped reflecting surface, falls incident on the filter that is provided in the light path between the incident surface of the prism and the liquid crystal light valve. The filter absorbs light rays of specified wavelengths, thus preventing them from reaching the side of the liquid crystal light valve. This blocks any light that would otherwise fall incident upon the backside of the liquid crystal light valve instead of advancing in the light path propagation direction through the dichroic prism. This, consequently, prevents any malfunction of the liquid crystal light valve due to the light illumination from the reverse light path direction.

In this scheme, half-wavelength plates should preferably be provided in the light path for the light beam of each color in addition to the above configuration in order to align the light beam of each color with the S polarized light. This arrangement, in which only the S polarized light is used, improves the color separation property of the dichroic prism as compared to the situation in which the random polarized light, containing both P and S polarized light rays, is used as is. Also, in this arrangement, in which a mirror is used to reflect light beams in the light guide system, the S polarized light has a higher reflectivity than the P polarized light, and, therefore, the arrangement has the advantage of being able to minimize the amount of light losses.

Further, in order to address the aforementioned second problem with conventional projection prism technology, the present invention includes adopting a structure in which the four triangle prisms of the same refractive index with right isosceles cross sections are affixed as described in the following:

Specifically, of the four aforementioned triangular prisms, the first triangular prism and the aforementioned third triangular prism are mutually affixed in a condition in which there is a first step difference in the vertical direction. The first exposed side is formed on one edge of the affixed side of the first triangular prism. Similarly, the aforementioned second triangular prism and the aforementioned fourth triangular prism are attached to each other such that there is a second step difference on the same edge, and a second exposed side is formed on one edge of the affixed surface of the second triangular prism. Further, the first and the third triangular prisms and the second and the fourth triangular prisms are attached, with a step difference between them, in such a way that the aforementioned first exposed side and the aforementioned second exposed side are located on the edges facing the same direction; and a third exposed surface that is orthogonal to the aforementioned first and second exposed surfaces is formed between the aforementioned first triangular prism and the aforementioned second triangular prism.

Thus, according to the way of attaching four triangular prisms together in the present invention, two exposed surfaces orthogonally located each other are formed on an edge of either the first or second triangular prisms. Therefore, the prisms can be attached accurately by using the orthogonal exposed surfaces as position alignment reference surfaces when the four triangular prisms are attached.

Further, the prism fixation plate that fixes one end of the aforementioned dichroic prism should be formed in the uneven structure which is fitted to the shape of the bottom surface of the aforementioned four triangular prisms and the aforementioned three exposed surfaces orthogonally located each other. By forming the prism-fixing plate in this manner, it is possible to ensure that the center of the prism unit is accurately aligned. The result is the attachment of the prism unit at an accurate position.

In this case, the first triangular prism and the third triangular prism should preferably be formed so that they are longer than the second triangular prism or the fourth triangular prism.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts,

FIGS. 2A and 2B show the arrangement of the components in the interior of the apparatus shown in FIGS. 1A through 1F in which FIG. 2A shows the planar arrangements and FIG. 2B shows the 3D arrangement thereof;

FIGS. 3A and 3B show a partial and isolated view of the optical lens unit and the projection lens unit, in which FIG. 3A is a schematic planar configuration diagram, and FIG. 3B is a schematic cross-sectional configuration diagram thereof;

FIGS. 4A and 4B show isolated views of the head unit, the prism unit, and the projection lens unit, in which FIG. 4A is a schematic planar configuration diagram, and FIG. 4B is a schematic cross-sectional configuration diagram thereof;

FIGS. 5A through 5C show the light valve block, in which FIG. 5A is a planar diagram, FIG. 5B a frontal view and FIG. 5C, a lateral view respectively thereof;

FIG. 6 is a schematic frontal diagram showing the shape of the head plate;

FIG. 7 is a schematic cross-sectional configuration diagram showing the configuration of the light source lamp unit;

FIG. 28 shows the drive voltage polarities of pixels when conventional liquid crystal light valves of different structures are used;

FIG. 29 is a graph showing the applied voltage-transmissivity characteristics of liquid crystals;

FIGS. 30A and 30B show how the process of writing RGB signals to a liquid crystal light valve is driven and controlled in the preferred embodiment;

DETAILED DESCRIPTION OF THE PREFERRED EMBODIMENT

Figure 1A:
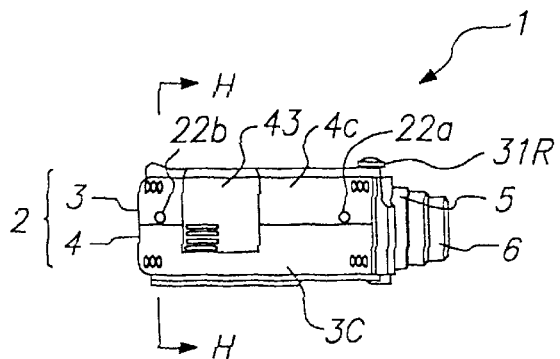
FIGS. 1A through 1F show the external outline of the projection-type display apparatus in an embodiment of the present invention.

The following is a description of the projection-type display apparatus, which is an embodiment of the present invention, with reference to drawings.
(Overall Configuration)

FIGS. 1A through 1F show the physical appearance of the projection-type display apparatus of the presently preferred embodiment of the invention. Projection-type display apparatus 1 of this embodiment has exterior case 2 with a rectangular solid shape. Basically, exterior case 2 comprises upper case 3, lower case 4, and front case 5 that defines the front side of the apparatus. The edge of projection lens unit 6 protrudes from the center of front case 5.

Figure 2A:
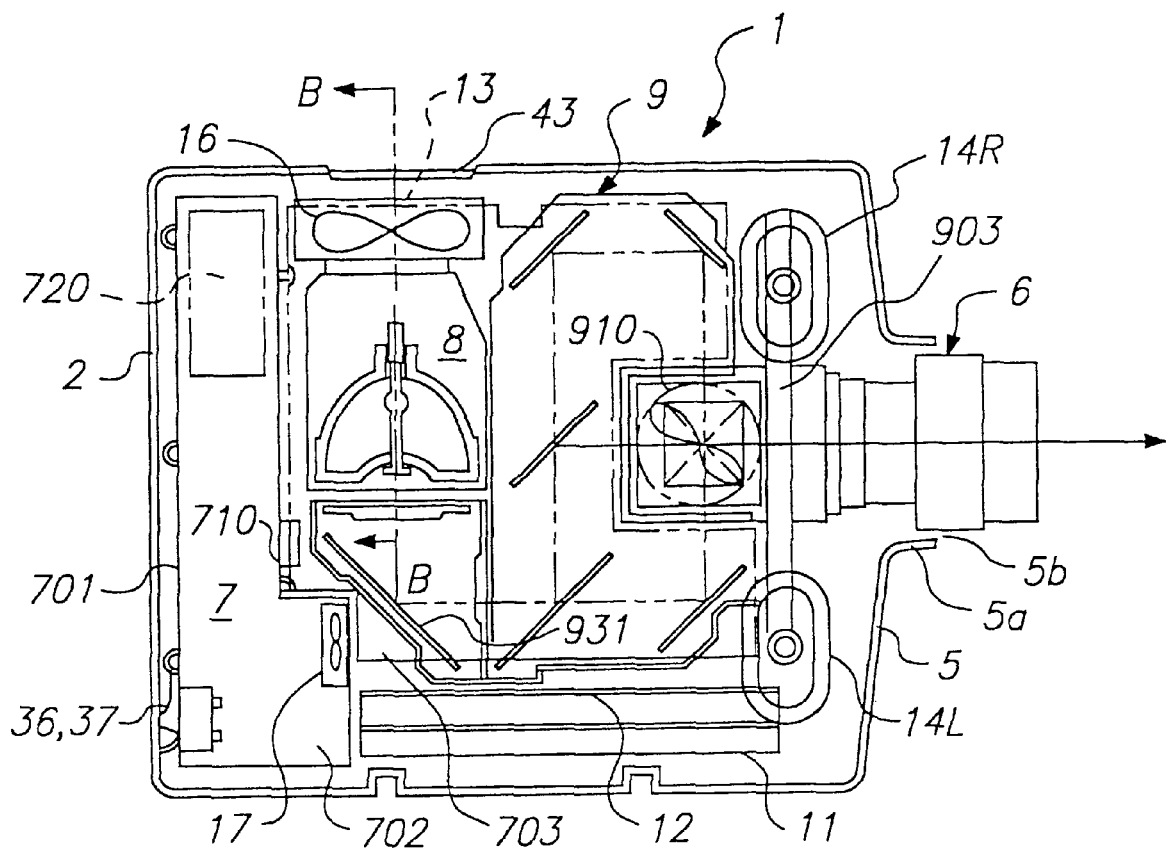
Figure 2B:
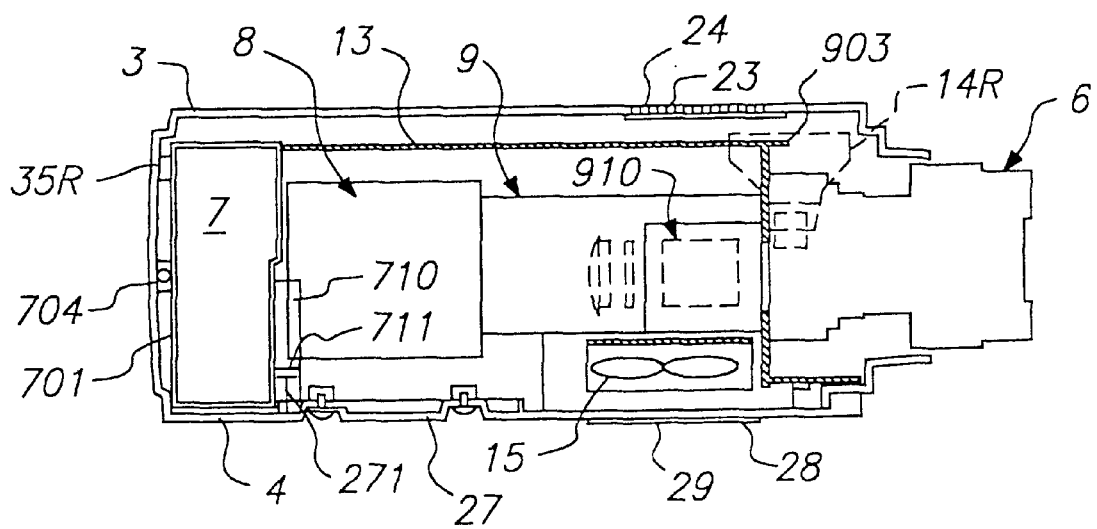

FIGS. 2A and 2B show the arrangement of the components inside exterior case 2 of projection-type display apparatus 1. As shown in the figures, light source unit 7 is located at the rear side in the interior of exterior case 2. light source lamp unit 8 and optical lens unit 9 are provided closer to the front side of the apparatus than the light source unit is. The base edge of projection lens unit 6 is located at the center of the front side of optical lens unit 9. On the other hand, interface board 11 on which input/output interface circuits are mounted in directions anterior and posterior to the apparatus is provided on one side of optical lens unit 9. Parallel to the interface board, a video board 12, on which video signal processing circuits are mounted, is provided. Further, a control board 13 that drives and controls the apparatus is provided above light source lamp unit 8 and optical lens unit 9. Speakers 14R and 14L are provided at the left and right corners, respectively, at the front edge of the apparatus. A cooling suction fan 15 is provided at the center of the backside of optical lens unit 9. An exhaust fan 16 is provided on the equipment side, which is the rear side of light source lamp unit 8. An auxiliary suction fan 17, which draws the cooling air current from suction fan 15 into the power supply unit, is provided at the position that faces the edge of boards 11 and 12 in the power supply unit 7.

In the projection-type display apparatus of this embodiment, the integrity and rigidity of the entire case are enhanced to improve the shock and fall resistance of the apparatus by fixing the upper and lower cases that compose the exterior case to those components among the built-in components that are especially strong.

Specifically, in this embodiment, the projection-type display apparatus has the following components: a light source lamp unit 8; a (color separator which separates the white light beam emitted by the light source lamp unit into angular light beams of the three primary colors; an optical lens unit 9 that contains three liquid crystal light valves 925R, G, and B which modulate the separated colored light beams, and a light synthesizer which combines the modulated light beams of the different colors that have been modulated; a projection lens unit 6 which projects the synthesized, modulated light beam onto a screen; and a power supply unit 7. In this projection-type display apparatus, equipment exterior case 2 is provided with an upper case 3 and a lower case 4 which are fitted together from the top and bottom in the direction of the thickness of the apparatus. The interior of the apparatus, which is partitioned by the upper and lower cases, contains aforementioned power supply unit 7 on the rear edge side of the apparatus. A head plate is provided on the front edge side of the apparatus. Plate prism unit 910, which is the color synthesizer for aforementioned optical lens unit 9, and the base edge of aforementioned projection lens unit 6, are fixed to the head plate. The equipment rear sides of aforementioned upper case 3 and lower case 4 are fixed to aforementioned power supply unit 7. The equipment front sides of these cases are fixed to aforementioned head plate 903.

Thus, the interlinking of upper case 3 and lower case 4 Through highly rigid components at the edges in front of and at the back of the apparatus enhances the rigidity of the case as a whole and results in improved fall resistance and shock resistance.

Further, in the projection-type display apparatus of the present embodiment, projection lens unit 6 and prism unit 910, that composes the color synthesizer for optical lens unit 9, are aligned along the optical axis direction across head plate 903 which is a highly rigid component; and these components are fixed to head plate 903. In this manner the integrity of the components is enhanced.

Because of this fact, there is little likelihood of these components getting misaligned even if the apparatus is subjected to shocks when it is dropped.

Further, in the projection-type display apparatus of the present embodiment, the heaviest components, projection lens unit 6 and power supply unit 7, are laid out appropriately so that the center of gravity of the apparatus coincides as much as possible with the geometric center of the apparatus. In other words, since, as a general rule, projection lens unit 6 is located on the front side of the apparatus, power supply unit 7 is provided on the rear side of the apparatus. In this manner, the center of gravity of the apparatus is made to coincide substantially with the front-end direction center of the apparatus. Alternatively, if projection lens unit 6 is provided either on the right or on the left, power supply unit 7 is located on the opposite side to counterbalance it.

Thus, if the equipment is accidentally dropped while being carried, it falls mainly in a horizontal position, a position in which the equipment is normally carried. In contrast to the case where the center of gravity is tilted to the front, back, right, or left, the equipment thus configured will avoid damage that might otherwise result if the equipment were dropped, and its front, rear, right, or left corner hit the floor first, and thus sustained the major impact.

In the projection-type display apparatus of the present embodiment, said heavy power supply unit 7 is fixed to one side of upper case 3 and lower case 4, and is also fixed to at least one side of said upper case 3 and lower case 4 in the direction of the thickness of the equipment at the height corresponding to the center of gravity of power supply unit 7.

In this manner, even when subjected to an external impact, the apparatus does not swing laterally, thus achieving improved shock resistance.

(Structure of the Exterior Case)

Figure 16A:
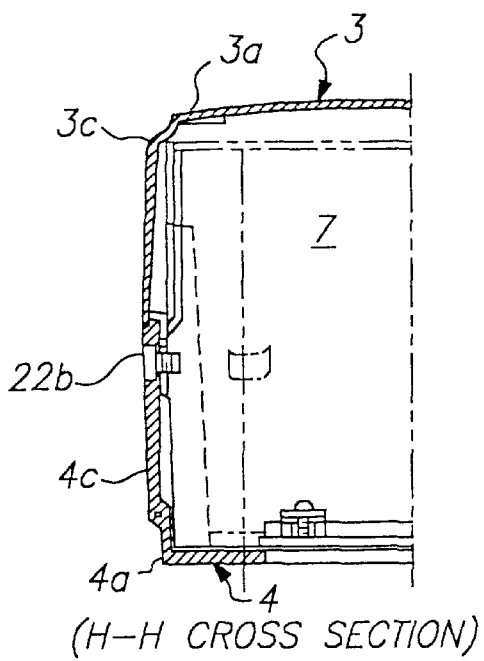
FIGS. 16A and 16B depict a partial cross-sectional diagram that show the fixed structure of the upper and lower cases.
Figure 16B:
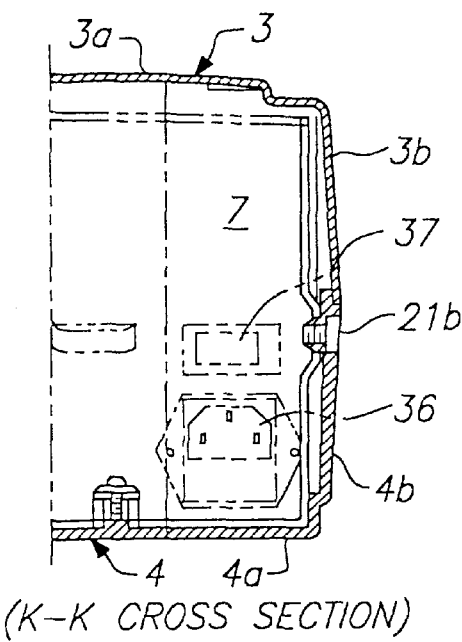

As shown in FIGS. 1A through 1F, upper case 3 of exterior portion 2 comprises a rectangular upper wall 3a, right and left side walls 3b, 3c and a back wall 3d which are extending virtually and vertically downward from the three sides, except for the front side. Similarly, lower case 4 comprises a rectangular bottom wall 4a, right and left side walls 4b, 4c and a back wall 4d which are extending virtually and vertically upward from the three sides, except for the front side. The central portion of front case 5 is convexly curved slightly forward. Round opening 5b, around which a ring-shaped rim 5a is formed, opens at the center of the front case. The forward edge of projection lens unit 6 extends through the opening to the front of the equipment. Upper case 3 and lower case 4 are interlinked by locking screws 21a, 21b, 22a, and 22b at two locations, each on the right and left sidewalls (first FIG. 6A and FIG. 16B). Front case 5 is held from the top and bottom by upper case 3 and lower case 4.

Figures 1B, 1C:
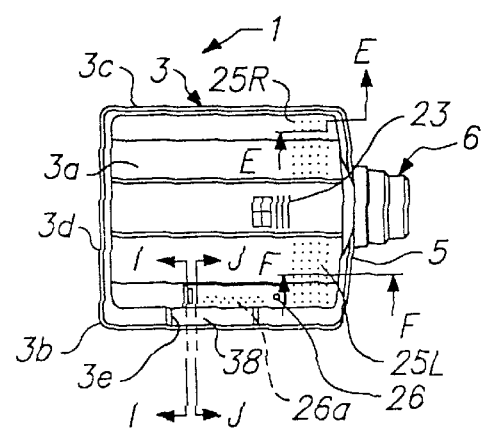
Figure 1D:
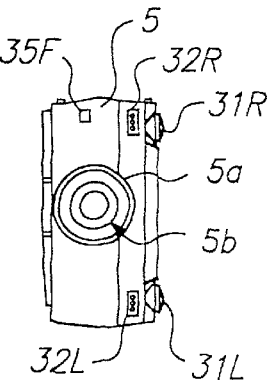
Figure 1E:
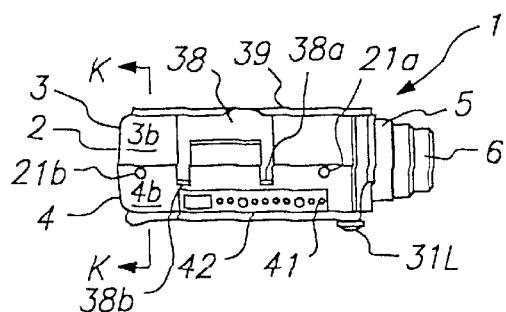
Figure 1F:
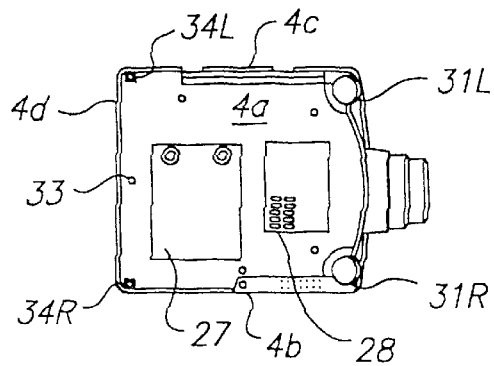

Air filter cover 23 is attached to the upper wall 3a of upper case 3 at the center forward position. A large number of ventilation holes are formed on cover 23. Air filter 24 is attached to the inside of the cover to prevent the intrusion of dust particles from the outside (FIG. 2B). Many communicating holes 25R and 25L are formed on the right and left edges on the forward side of upper wall 3a at positions corresponding to built-in speakers 14R and 14L. Operator switch cover 26 is attached to the left edge of upper wall 3a. Operator switch cover 26, with one of the edges acting as the pivot, can be opened and closed, as shown in FIG. 1C. Opening cover 26 exposes many operator switches 26a that are provided inside the cover (FIG. 27B).

Lamp exchange cover 27 is attached to the bottom wall 4a of lower case 4 at the position corresponding to light source lamp unit 8. The exchange cover 27 is screwed onto lower wall 4a. By loosening the screw and removing cover 27, one can replace light source lamp unit 8. Ventilation hole 28 is formed at a position anterior to exchange cover 27. Ventilation hole 28 is formed at the position corresponding to built-in, cooling suction fan 15. Air filter 29 (FIG. 2B) is also attached to the backside of ventilation hole 28 in order to prevent the incursion of dust particles to the inside from here.

Height adjustment feet 31 (31R and 31L) are provided at the right and left corners of the front edge of bottom wall 4a. By rotating foot 31, one can micro-adjust the height. By operating height adjustment buttons 32 (32R and 32L) that protrude toward the lower side portions of the two edges of front case 5, one can perform gross adjustments of the height of feet 31. Protrusion 33 is formed at the center of the rear edge of bottom wall 4a. Apparatus 1 is set on a table, supported at three points by process 33 and the two feet 31 described above. If the surface on which the apparatus is set has surface irregularities, auxiliary processes 34R and 34L are also formed on the two edges of the rear side of the bottom wall so that the apparatus will not rattle.

On the other hand, skylights 35F and 35R, respectively, are provided at the upper right position of front case 5 that defines the front side of the equipment and at the center of rear wall 3d of upper case 3 that defines the top half of the rear side of the equipment. These skylights receive the controlling light rays from the remote controller. Thus, in this embodiment, skylights are formed both in front and at the rear of the equipment, thus permitting one to perform remote control on the equipment from either the front or the rear side of it.

AC inlet 36 for supplying external power and main power supply switch 37 are provided on the left of rear wall 4d of lower case 4 that defines the lower half portion of the rear side of the equipment.

Carrying handle 38 is provided on the left side of the equipment. The base edges 38a and 38b of handle 38 are attached in a rotatable manner at the alignment surfaces of side walls 3b and 4b of lower case 4. Handle receptacle recess 3e is formed on side wall 3b on the upper case side so that handle 38 can be fitted in the recess. LED display 39 that displays the operating status of the equipment is provided at the upper edge of side wall 3b. Input/output terminal cover 41, which can be opened and closed and is hinged on the lower edge of the cover serving as the center, is provided on side wall 4b on the lower case side. Opening the cover exposes the many input/output terminals 42 that are located inside the cover (FIG. 27A).

Exhaust hole 43 is formed on side walls 3c and 4c of the upper and lower cases that define the opposite sides of the equipment, such that the hole extends from one side wall to the other. Cooling exhaust fan 16 is located on the rear side of exhaust hole 43 though an air filter.

(Light Source Lamp Unit)

The following describes light source lamp unit 8 with reference to FIGS. 2A and 7.

Light source lamp unit 8 comprises light source lamp 801 and an approximately rectangular, solid lamp housing unit 802 that houses; the light source lamp. In this embodiment, lamp housing 802 has a double structure composed of inner housing 803 and outer housing 804. Light source lamp 801 comprises a lamp 805, such as a halogen lamp, and a reflector 806. The light rays from lamp 805 are emitted toward optical lens unit 9 along light axis 1a.

In outer housing 804, the front side, in the direction of light axis 1a, is an opening at which UV filter 809 is attached. In the direction of light axis 1a, a large number of slits 807 through which the cooling air passes are formed on the back side. Inner housing 803 is attached to the front surface of light source lamp 801. That part of the inner housing through which the emitted light passes is open. A large number of cooling air passage holes 808 are formed on the periphery of the inner housing. In this embodiment inner housing 803 and light source lamp 801 are formed in an integral manner. To replace the lamp, one detaches both the inner housing and the lamp as a set.

(Optical Lens Unit)

Figure 3A:
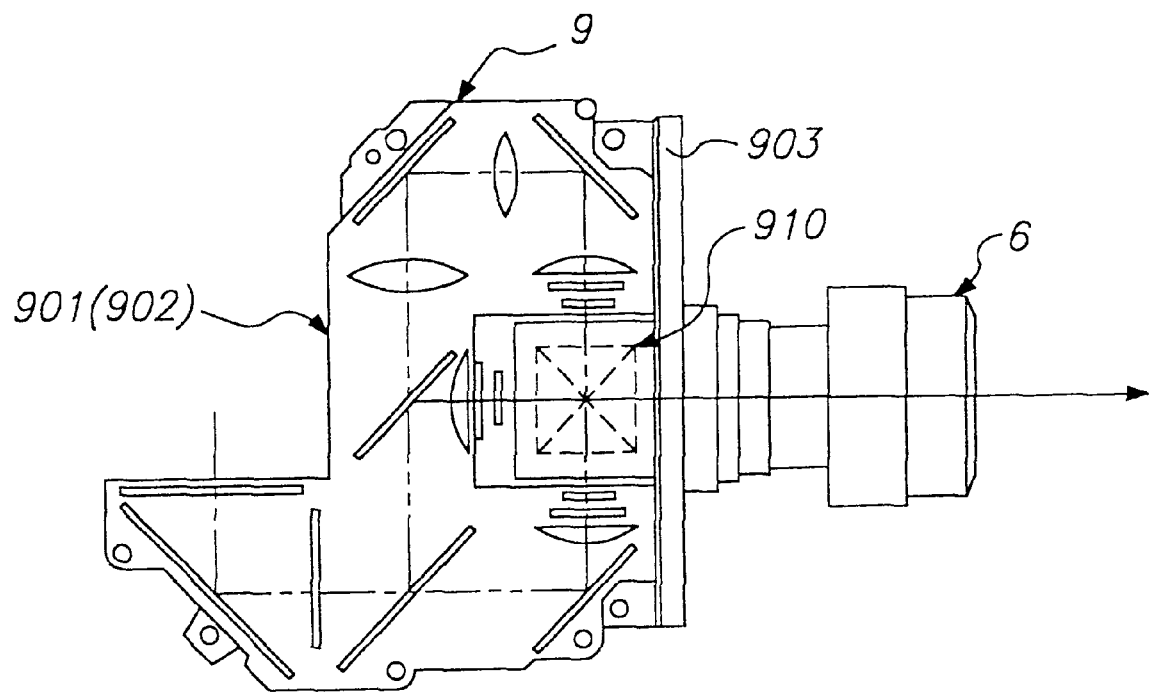
Figure 3B:
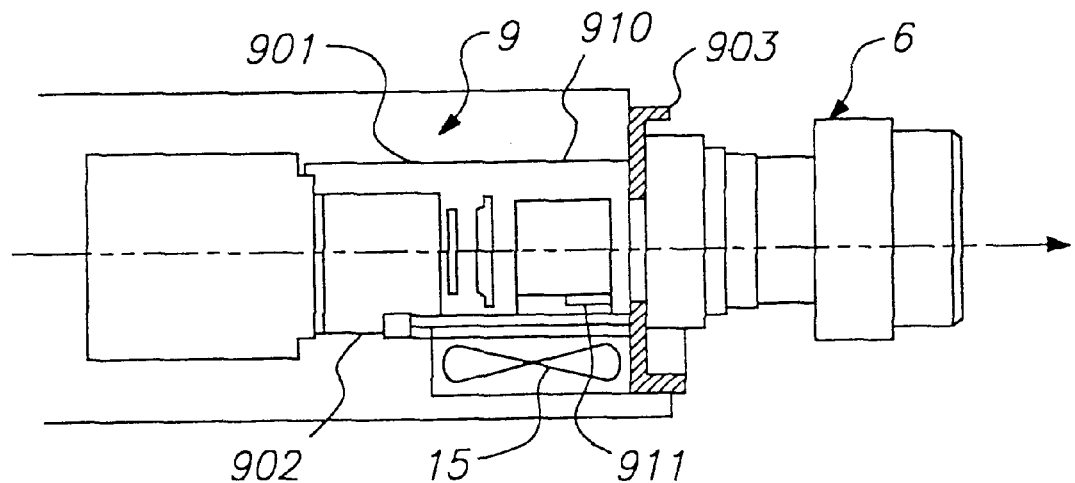

Optical lens unit 9 is constructed such that its optical devices, other than prism unit 910, comprising the color synthesizer, are held from the top and bottom by upper and lower light guides 901 and 902 as shown in FIG. 3A. These upper light guide 901 and lower light guide 902 are fixed to the sides by upper case 3 and lower case 4 and locking screws. Similarly, these upper and lower light guides 901 and 902 are fixed to the sides of prism unit 910 by locking screws. Prism unit 910 is fixed to the back side of thick head plate 903, which is a die-cast plate, by means of locking screws. The base edge side of projection lens unit 6 is similarly fixed to the front side of head plate 903 by means of locking screws. Therefore, in this embodiment, prism unit 910 and projection lens unit 6 are fixed together as an integral body holding head plate 903 between them. Thus the two components holding rigid head plate 903 form an integral whole. Consequently, even when projection lens unit 6 receives an impact from an outside source, these components do not fall out of alignment.

(Optical System)

Figure 19:
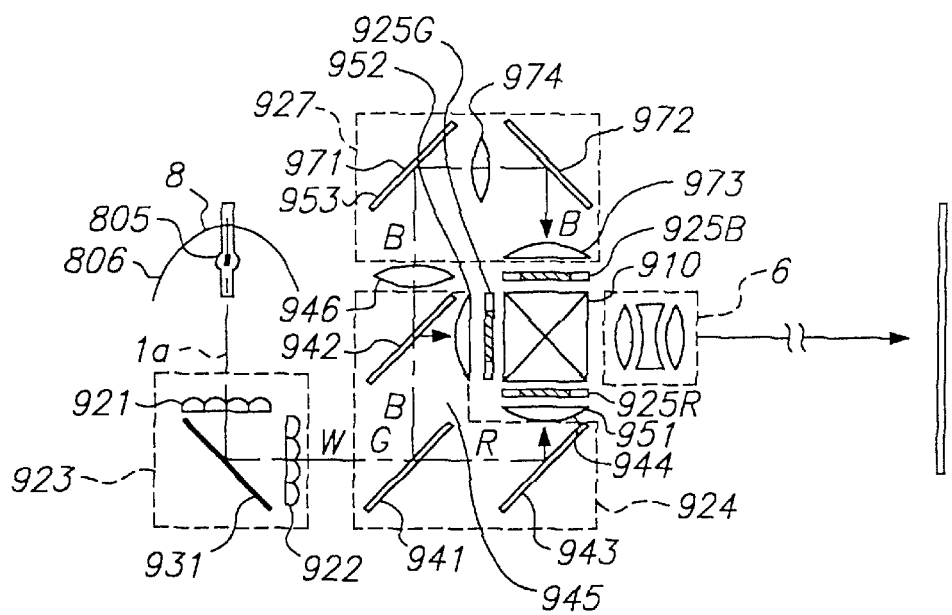
FIG. 19 is a schematic configuration diagram of the optical system that is incorporated into the apparatus shown in FIGS. 1A through 1F.
Figure 20:
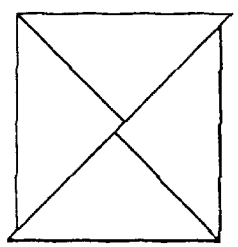
FIG. 20 shows an example of a position misalignment of the prism unit.
Figure 21:
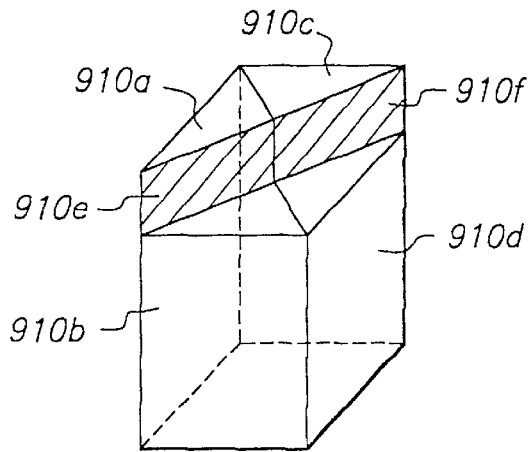
FIG. 21 depicts the conventional method for attaching a prism unit.

FIG. 19 shows the optical system for projection-type display apparatus 1 of this embodiment. The optical system of this embodiment comprises the following: the aforementioned light source lamp 805, illumination optical system 923, comprising integrator lenses 921 and 922 which are uniform-illumination optical devices, color separation optical system 924 which separates the white light beam W emitted by illumination optical system 923 into colored light beams R, G, and B, which are red, green, and blue, three liquid crystal light valves 925R, 925G, and 925B, which modulate the colored light beams, prism unit 910, which is a color synthesis optical system that recombines the modulated colored light beams, and projection lens unit 6 which enlarges and projects the recombined light beam onto a screen. The built-in optical system also contains a light guide system 927 which guides, blue light beam B from among the colored light beams separated by color separation optical system 924, to the corresponding liquid crystal light valve 925B.

For example, a halogen lamp, a metal halide lamp, or a xenon lamp can be used for light source lamp 805. Uniform-illumination optical system 923 is provided with reflecting mirror 931 which bends the central optical axis la of the light ray emitted by the illumination optical system 90 degrees in the forward direction of the equipment. Integrator lenses 921 and 922 are provided across mirror 931 both in front and in back of the mirror at orthogonal positions.

Color separation optical system 924 comprises blue-and-green reflecting dichroic mirror 941, green-reflecting dichroic mirror 942, and reflecting mirror 943. When the white light beam W strikes blue-and-green reflecting dichroic mirror 941, first, the blue light beam B and the green light beam G contained in the white light beam are reflected 90 degrees and travel toward green-reflecting dichroic mirror 942. The red light beam R passes through mirror 942, is reflected 90 degrees by rear reflecting mirror 943, and emitted from red light beam emitting portion 944 toward prism unit 910. Third, the blue and green light beams B and G, reflected by mirror 942, strike green-reflecting dichroic mirror 942; there, only the green light beam G is reflected 90 degrees and emitted from green light beam emitting portion 945 toward the color synthesis optical system. Last, the blue light beam B passing through mirror 942 is emitted from blue light beam emitting portion 946 toward the light guide system. In this embodiment, the distances from the white light beam emitting portion for the uniform-illumination optical device to emitting portions 944, 945, and 946 of the color light beams in color separation optical system 924 are all designed to be equal.

Condensing lenses 951, 952, and 973 are provided for different color light beams on emitting portions 944, 945, and 946 in color separation optical system 924 and light guide system. Consequently, the light beams of different colors emitted from the emitting portions fall incident on these condensing lenses 951, 952, and 973 and become parallel. Of the colored light beams R, G, and B that are made parallel, the red and green light beams, R and G, fall incident upon liquid crystal light valves 925R and 925G, and are modulated. Video information corresponding to light rays of different colors is added to the incident rays. Thus, these light valves are switch-controlled by a driver (not shown in the figures) according to the supplied video information, and this process modulates the light rays of different colors that pass through the valves. Various means that are available in the public can be used as is for such a driver. On the other hand, the blue light beam B is guided through light guide system 927 to corresponding liquid crystal light valve 925B where the blue light beam is modulated in a similar manner according to the supplied video information. According to this embodiment, light valves includes polycrystalline silicon thin film transistors serving as switching devices.

Light guide system 927 comprises an input-side reflecting mirror 971, an output-side reflecting mirror 972, an intermediate lens 974 placed between these mirrors, and a condensing lens 973 placed in the forward location of liquid crystal panel 925B. In terms of the light path lengths of light beams of various colors, the blue light beam B has the greatest distance from light source lamp 805 to a given liquid crystal panel, and, consequently, the blue light beam sustains the greatest amount of loss in luminous energy. The amount of loss in luminous energy can be reduced by providing a light guide system 927. In this manner the light path lengths for different light beams can be made substantially equal.

The light beams of different colors that have been modulated after passing through liquid crystal panels 925R, G, and B enter color synthesis optical system 910 and are recombined there. In this embodiment, the color synthesis optical system is made of prism unit 910 that is composed of a dichroic prism, as described above. The color image that is recombined by the color synthesis optical system is enlarged and projected onto a screen at a specified position through projection lens unit 6.

In the optical system of the present embodiment, a half-wavelength plate should preferably be provided in the paths of light beams of various colors in order to collimate the light beams with the S polarized light. Thus, by ensuring that only the S polarized light rays are used, even in situations where both P- and S-polarized light rays exist on a mixed basis, the extent of light separation that can be achieved using the dichroic mirror is enhanced as compared to the situation where random polarized light rays are used without modification. Light guide system 927, which reflects light beams using a mirror, offers greater reflectivity for the S-polarized light rays than the P-polarized light rays. In this way, the optical system of the present embodiment offers the advantage of minimizing the loss of luminous energy.

Figure 34:
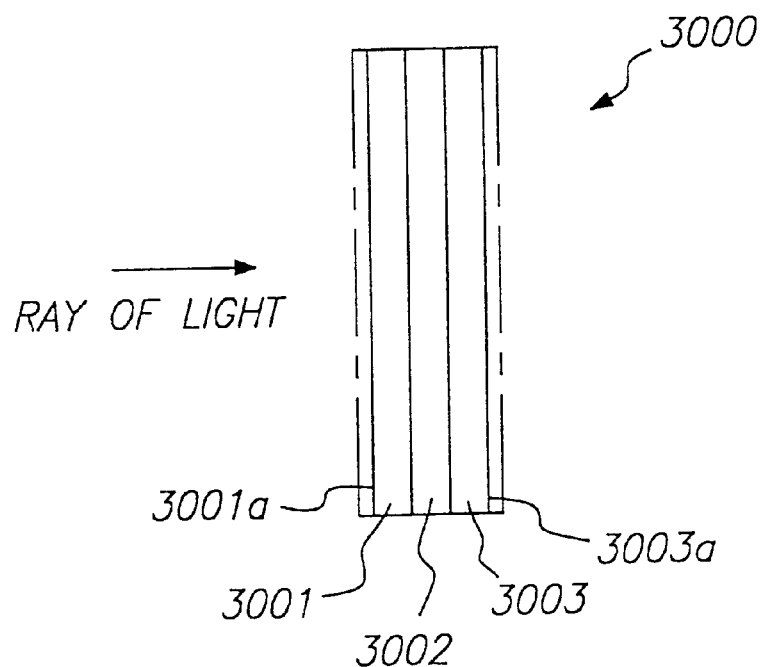
FIG. 34 shows the configuration of the half-wavelength plate.

As shown in FIG. 34, a laminated plate 3000 comprises transparent glass board 3001, a half-wavelength plate 3002 attached to one side of glass plate, and a polarizer plate 3003 attached to the surface of the half-wavelength plate 3002. When applying this structure to the present embodiment, for embodiment, by placing the half-wavelength plate on the red and blue light paths, it suffices to provide a non-reflecting coating on surface 3001a of the glass substrate and on surface 3003a of the polarizer plate in order to enhance the traismissivity; likewise, when placing the half-wavelength plate on the green light path, it suffices to attach a green filter to surface 3001a of the glass substrate while not treating surface 3003a of the polarizer plate. It is preferable to obtain an image with an overall high CR ratio by using a polarizer plate 3003 that is high in CR ratio (degree of polarization) at the expense of brightness on the laminated plate that is placed on the green light path.

Figure 35:
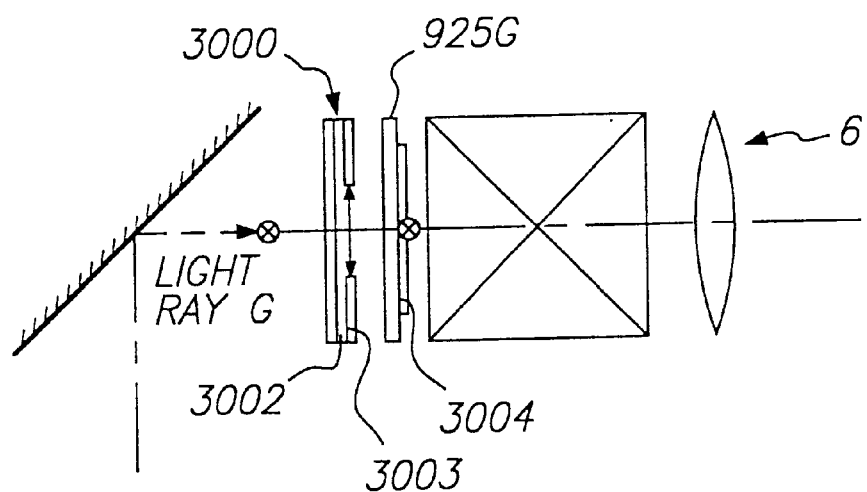
FIG. 35 is a partial configuration diagram showing a part of the optical system for a green light beam for which a half-wavelength plate is provided.

FIG. 35 shows an embodiment in which a half-wavelength plate is provided on the green light path for the optical system of the present embodiment. The figure shows a top-down view. For the enlarged, projected image, the transmission axis is the top-to-bottom direction. The transmission axis of the light beam falling incident upon the liquid crystal light valve is oriented in the top-to-bottom direction. The transmission axis of the polarizer plate 3003 that is attached to half-wavelength plate 3002 is orthogonal to that direction. The transmission axis of the polarizer plate 3004 located on the output side of liquid crystal light valve 925G is oriented in the top-to-bottom direction. Half-wavelength plate are also similarly provided on the red and blue light paths.

(Prism Unit 910) Prism unit 910 has an angular column shape with a square cross section formed by attaching four triangle column prisms having the same refractive index. A dielectric film is formed on each attachment surface to confer the desired optical properties to the prism unit.

Figure 22:
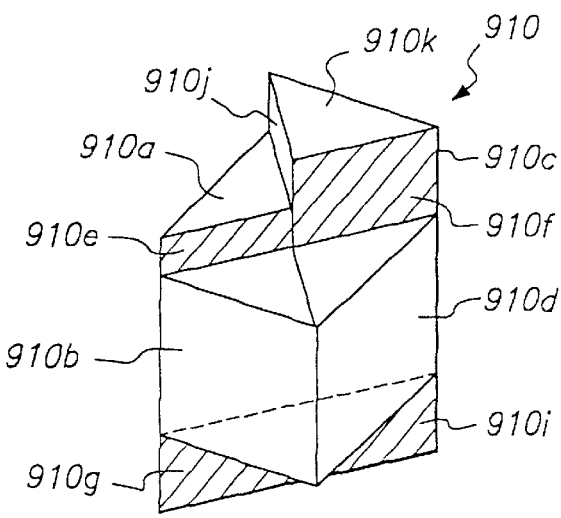
FIG. 22 depicts the method by which the prism unit is attached and the shape of the prism unit fixing plate in an embodiment of this invention.

As shown in FIG. 22, prism unit 910 of the present embodiment is made by accurately fixing four prisms as following. First, prism 910c (the first triangle prism) is the longest, prisms 910d and 910b (the third and fourth triangle prisms) are the shortest, and the remaining prism 910a (the second triangle prism) is an intermediate length. The longest prism 910c and the shortest prism 910d are attached to each other in such a way that a vertical step difference is created between them. Similarly, the intermediate-length prism 910a is attached to the shortest prism 910b in such a way that a vertical step difference is created between them. After that, the pairs of prisms are attached so that a step difference is created on the top edge side between the longest prism 910c and the intermediatelength prism 910a.

In prism unit 910 obtained by attaching the individual prisms, position alignment surfaces 910g and 910i are formed on the lower edge parallel to the conventional position alignment surfaces 910e and 910f (the exposed lateral surface). Further, a position alignment surface 910j (the exposed lateral surface) is formed that is orthogonal to these position alignment surfaces. Therefore, one can accurately attach the four prisms by pressing a tool against these surfaces.

Further, for prism unit 910 of the present embodiment so attached together, one can accurately position optical lens unit 9 by attaching it to the desired attachment position as described below by using the orthogonal position alignment surfaces 910f and 910j that are formed on the upper edge of prism 910c.

Figure 23:
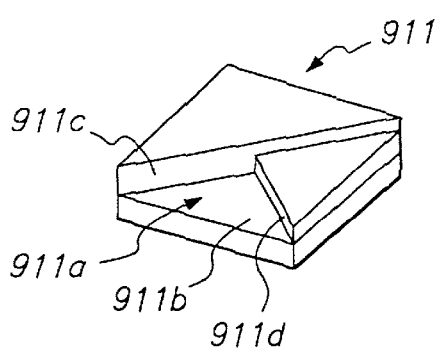
FIG. 23 depicts a fixture plate for fixing a prism unit according to an embodiment of this invention.

Specifically, as shown in FIG. 23, fixture plate 911 for fixing a prism made of resin, is used in the present embodiment. There is groove 911a on fixture plate 911 for fixing with a right isosceles triangle shape with a depth such that the upper edge surface 910j of aforementioned prism 910c fits exactly in it is formed on the surface of fixture plate 911. The upper edge surface 911a of prism 910c is bonded and fixed to the bottom surface 911b of the groove. By pressing the position alignment surfaces 910f and 910j of prism 910c against the pair of orthogonal lateral sides, 911c and 911d, respectively, of the groove, one can accurately align the center of prism unit 910. In this way, prism unit 910 can be attached at an accurate position.

In this embodiment, prism-fixing plate 911 is fixed to the bottom wall 92 of head plate 903 by means of locking screws, and the resulting structure is such that prism unit 910 is mounted on the top side of the head plate.

(Mechanism for Preventing Optical Crosstalk)

Figure 24:
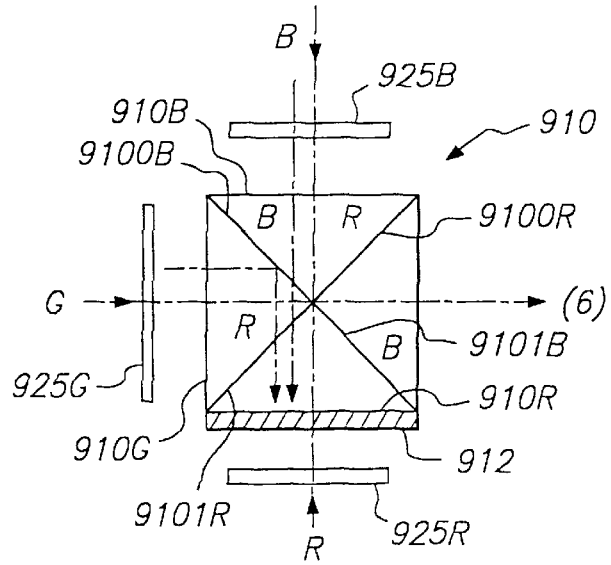
FIG. 24 shows a preferred embodiment of a prism unit.

In prism unit 910 of the present embodiment, it is desirable to attach glass filter 912 to this prism surface into which modulated light beam that has passed through light valve 925R enters. Filter 912 absorbs and blocks the blue light beam and makes red light beam to pass through. As shown in FIG. 24, Filter 912 is attached to surface 910R of prism unit 910 where modulated red beam enters. Modulated light beams of different colors that have passed through light valves 925R, G, and B pass through prism unit 910 and they are reflected by the X-shaped reflecting surface of prism unit 910 and output to the side of projection lens unit 6.

In each color, however, a small amount of light is not reflected by the reflecting surface and passes through the reflecting surface and reaches the sides of the liquid crystal light valves that are located across prism unit 910. For embodiment, blue modulated light beam is happened to pass through blue reflecting surface 9101B and reach the backside of the red light valve 925R. Conversely, red modulated light beam is happened to pass through red reflecting surface 9101R and reach the backside of the red light valve 925B. Further, green modulated light beam, not passing through the prism unit 910, is sometimes reflected to the side of red light valve 925R. Thus, a light ray entering a liquid crystal light valve from the back side could cause adverse effects, such as a malfunction of the liquid crystal panel. This effect is especially significant in the case of blue light rays which are short wavelength light rays.

In order to overcome this problem, the present embodiment shows that glass filter 912 is attached to the incident surface 910R for the red modulated light beam for prism unit 910, as described above, so that blue light beam will not reach backside of liquid crystal light valve 925R.

It should be noted that a filter that absorbs a red light beam can also be attached to the incident surface of the blue modulated light beam in addition to filter 912 mentioned above.

(Arrangement of a Power Supply Unit and a Base)

In the projection-type display apparatus of the present embodiment, the following measures are taken to minimize the length of equipment power supply lines and the length of supply lines for internal electrical signals both of which are sources of noise: specifically, power supply unit 7 and the built-in power supply circuits are covered by shield case 701, and the external power supply inlet and power supply switch 37 are directly fixed to the shield case.

Further, interlock switch 710, which turns the equipment power supply unit on and off in tandem with the attachment and detachment of the lamp exchange cover 27 for replacing light source lamp 801, which is formed on the exterior equipment case, is fixed to shield case 701 of power supply unit 7.

Consequently, as in the case where these units are separate and removed from power supply unit 7, the need for a lead wire, which is normally strung around the exterior of power supply unit 7 for connecting power supply unit 7, is eliminated. As a result, such a lead wire is laid out only within power supply unit 7 and shielded by shield case 701. This permits minimizing the power supply line which is a source of noise.

Further, light source lamp unit 8 and power supply unit 7 are located adjacent to each other.

This also minimizes the length of the lead wire for connecting these units, thus minimizing the amount of noise generated by these components.

Further, interface board 11, on which interface circuits that are provided within the equipment are mounted; video board 12, on which video signalprocessing circuits are mounted; and control board 13, on which drive control circuits are mounted, are arranged as follows: first, interface board 11 and video board 12 are arranged so that parts of them at least are in close proximity to each other so that an electrical connection is formed between the boards at the adjacent position. Similarly, said video board 12 and said control board 13 are arranged so that parts of them at least are in close proximity to each other so that an electrical connection is formed between the boards at the adjacent position.

Thus, as in the case where these boards are located fair from each other, the need to lay a large number of signal lines is eliminated. Thus, minimizing the length of the signal lines, which are sources of noise, suppresses noise generation.

Said interface board 11 and said video board 12 are fixed inside the equipment using a common board-fastening plate, and the circuit-fastening plate is used as a shielding plate to form a shield structure composed of said interface board 11 and video board 12.

Thus, a compact shield structure of these board components can be formed.

The following describes the specific constitution of the shield structure.

As shown in FIG. 2A, in power supply unit 7 the component devices are built into the interior of a metal shield case 701 in order to prevent any leakage to the outside of the electric and magnetic noise that is generated in the power supply unit. Shield case 701 has a size that extends from the right to the left side walls of exterior case 2 of the equipment. The left side of the shield case has a planar shape that protrudes at a fixed width toward the front part of the equipment. In other words, a reflecting mirror 931 for the uniform illumination system for optical system block 9 is provided in front of the protruding unit 702, at a 45-degree angle to the anterior-posterior direction of the equipment. The space on the back side of the protruding unit tends to be a dead space. To ensure effective utilization of space 703, in this embodiment, shield case 701 is made to protrude as far as the side of space 703, thus ensuring the availability of space for the constituent components for the power supply unit.

Shield case 701 for power supply unit 7 has a rectangular hollow cross section and generally a greater rigidity than the other components. The bottom side of case 701 is fixed to bottom 4a of lower case 4 using locking screws. Similarly, the top side of the case is fixed to top wall 3a of upper case 3 using locking screws. Thus, in this embodiment, fixing both upper case 3 and lower case 4 at the rear edge of the equipment to a highly rigid shield case 701 ensures a high degree of integrity and rigidity for the exterior case at the rear edge of the equipment.

Figure 18:
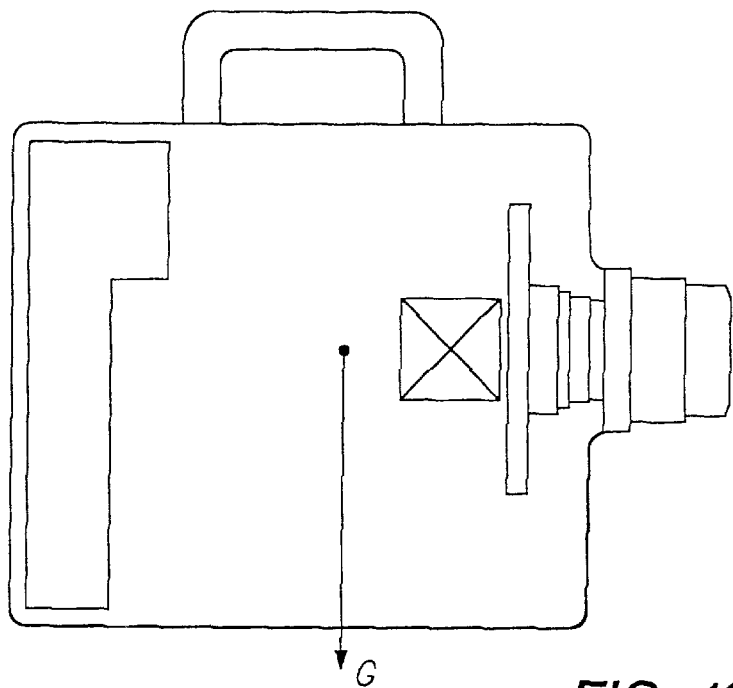
FIG. 18 indicates the center of gravity of the apparatus shown in FIGS. 1A through 1F.

It should be noted that power supply unit 7 is heavier than the other components that are provided inside the equipment. Other heavy components in the equipment, along with power supply unit 7, include prism unit 910, which is fixed at the front and back of head plate 903, and projection lens unit 6. As FIG. 2A indicates, power supply unit 7 in this embodiment is arranged sideways at the rear edge of the equipment. The constituent elements of power supply unit 7 are arranged appropriately so that their center of gravity is adjusted to occur at the center of the equipment in the width direction. On the other hand, prism unit 910 and projection lens unit 6 are located at the center of the front edge of the equipment. Consequently, in this embodiment, the center of gravity of the equipment occurs approximately at the center in both the width direction and anterior-posterior direction of the equipment. As a result, if the carrying handle 38 is drawn out and the equipment is carried in the orientation in which the left side of the equipment is turned up, as shown in FIG. 18, and if the equipment is dropped accidentally, the equipment falls in that orientation because its center is located at the center both in the right-left direction and in the anterior-posterior direction. If the center of gravity of the equipment is tilted either to the front or back or to the right or left of the equipment, the equipment will fall, tilting toward the center of gravity. When the equipment falls in this way, a corner of its exterior case will be the first to hit the floor. This exerts a locally excessive impact force, and results in a high likelihood of damage to the affected part. In this embodiment, however, since the equipment will fall "as is" without tilting either laterally or in the anterior-posterior direction, the entire right side at the bottom of the equipment hits the floor virtually simultaneously, thus substantially reducing the possibility of any local damage occurring.

Further, conventional power supply unit 7 is fixed to the side of exterior case 2 only at the top or bottom. By contrast, as illustrated in FIG. 2B, in this embodiment power supply unit 7 is fixed to the side of exterior case 2 using locking screws 704 even at the height position corresponding to the center of gravity in the vertical direction of the equipment. In this embodiment, the power supply unit is fixed to rear wall 4d of lower case 4. As a result, the back-and-forth oscillations of power supply unit 7 are effectively prevented even when back-and-forth vibrations are applied to the equipment.

On the other hand, in power supply unit 7 the power supply paths from the power supply unit to various mechanical parts are minimized, thus minimizing the need for lead wires which generate noise and suppressing the generation of noise. As an embodiment, both AC inlet 36 and main power supply switch 37 are directly fixed to the rear side of shield case 701 of power supply unit 7. This eliminates the need for lead wires that are drawn from these components to power supply unit 7. Further, interlock switch 710, that moves in tandem with The opening and closing operations on lamp exchange cover 27 attached to the rear surface of the equipment, is also attached in an integral manner to the front side of shield case 701 for power supply unit 7. As shown in FIG. 2A, interlock switch 710 is attached at the right side of the equipment at a position slightly away from the shield case process 702. The operating part 711 of switch 710 faces down and is constantly pressed upward by an action protrusion 271 that extends vertically from the top surface of exchange cover 27. In this state interlock switch 710 remains on. On the other hand, if exchange cover 27 is removed, the operating part of switch 710 shifts downward, thus changing the switch to the off state. Thus, switch 710, which is conventionally located at a distance from power supply unit 7, is fixed to the side of shield case 701 for the power supply unit, thus reducing the length of the lead wires.

Further, in power supply unit 7 of this embodiment a ballast circuit 720, which is the drive circuit for the lamp unit 8 that is located adjacent to the power supply unit at the front side of the equipment is provided on the same side as lamp unit 8, thus minimizing the length of the lead wires extending from there to lamp nit 8. Thus, in this embodiment, the power supply path drawn out from power supply unit 7 and leading to the mechanical components is, shortened. This reduces the number of noise sources as compared to the conventional case, thus suppressing the generation of noise.

Figure 11:
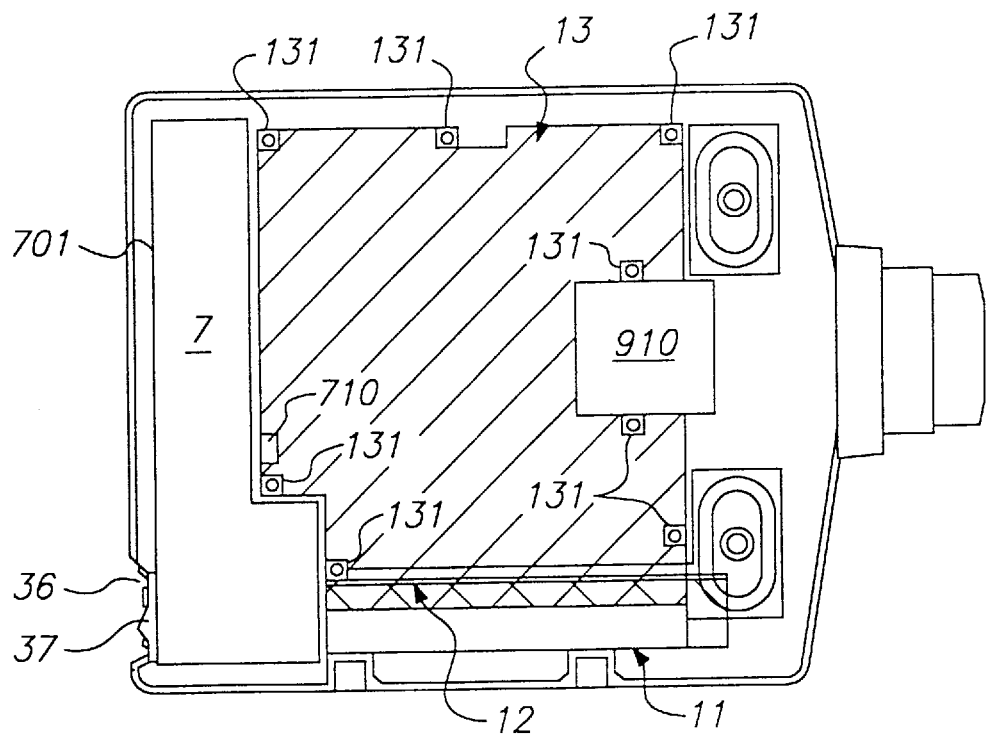
FIGS. 11–13 explain the arrangement of the circuit boards housed inside the preferred projection apparatus.
Figure 12:
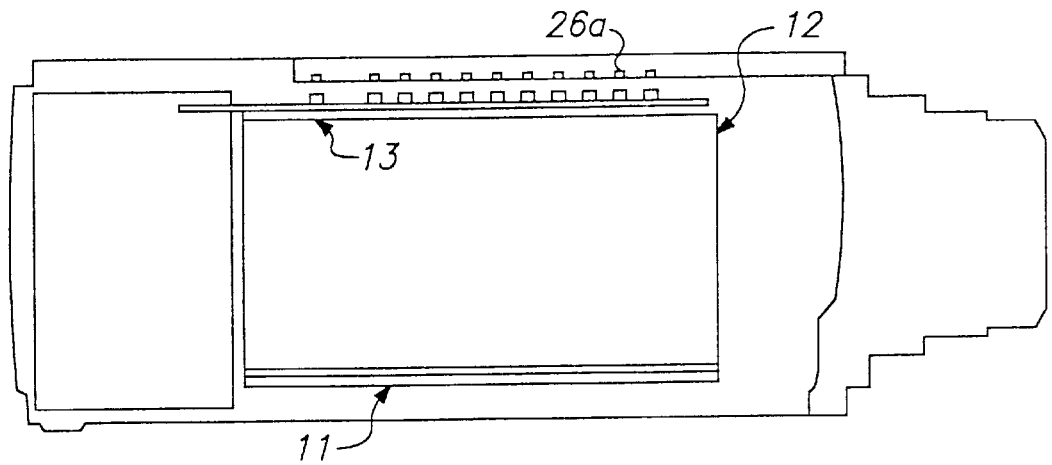
Figure 13:
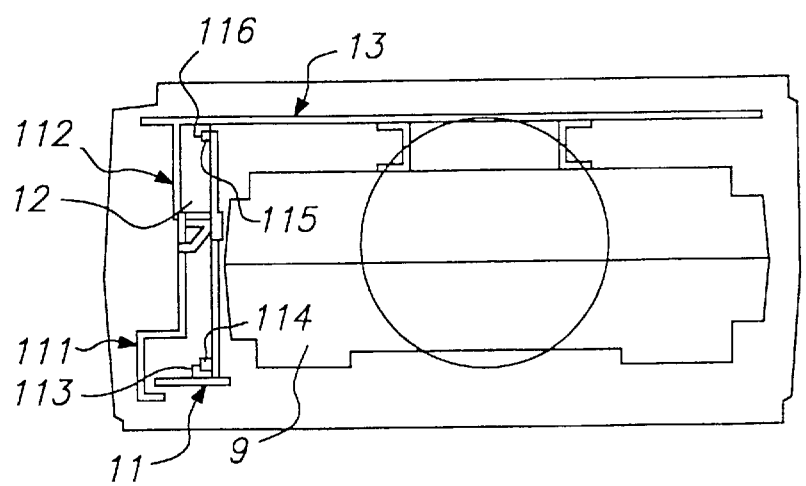

The following describes the arrangement of interface board 11, video board 12, and control board 13 with reference to FIGS. 11, 12, and 13. First, control board 13 is placed at the lower position of upper wall 3a of upper case 3 parallel to the upper wall and fixed to the side of upper case 3 at the periphery at several spots by locking screws. This board 13 has a shape that covers the top surface of optical system block 9 and light source lamp unit 8. The part directly above prism unit 910 has a shape that is cut into rectangular sub-units. The edge on the left side of the equipment of board 13 is provided with contact points that correspond to operator switches 26a that are arrayed on the left side edge of the top surface of the equipment.

As shown in FIG. 13, interface board 11 is placed in parallel to and at a position slightly higher than the bottom wall 4a of lower case 4. Video board 12 is placed parallel to the side wall on the left side of the equipment in the upright position in the vertical direction of the equipment from the surface side of interface board 11. These two boards, 11 and 12, are supported by board-locking fixture 111 that is fixed to the bottom wall 4a of lower case 4. Shielding plate 112 is attached to the top edge of board-locking fixture 111. The top edge side of shielding plate 112 extends to the top edge of video board 12. Therefore, a shielding space is partitioned and formed by and between these two boards, 11 and 12, shielding plate 112, and board-fastening fixture 111. Consequently, this prevents any leakage of noise generated by electric and electronic devices that are provided between these components.

Here, the boards are electrically connected as follows: First, connector 113 to the side of video board 12 is provided on the surface of interface board 11. On the surface of the lower edge of video board 12, a connector 114 is provided that can be plugged into connector 113. Similarly, a connector 115 to the side of control board 13 is provided on the surface of the upper edge of video board 12. A connector 116, which can be plugged into connector 115, is provided on the back side of control board 13. Therefore, as shown in FIG. 13, when boards 11, 12, and 13 are placed together, the corresponding connectors are interconnected.

Thus, in this embodiment the boards can be connected with no need for laying lead wires. This reduces the number of noise sources and thus suppresses the generation of noise.

Further, in this embodiment, as shown in FIG. 11, the corners of the periphery of control board 13 are fixed to the side of exterior case 2, i.e., the grounding side, using locking screws. These corners are liable to produce noise. However, as in this embodiment, by grounding these components it is possible to suppress the generation of noise.

(Structure of the Head Plate Component)

Figure 4A:
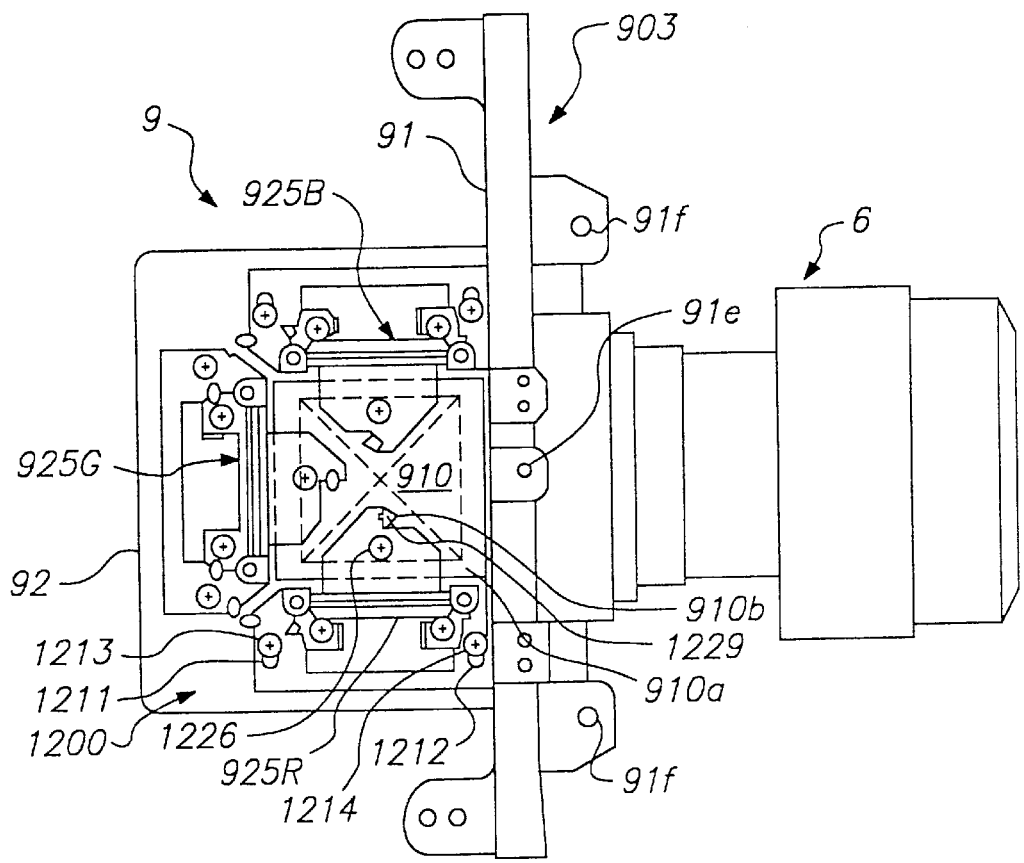
Figure 4B:
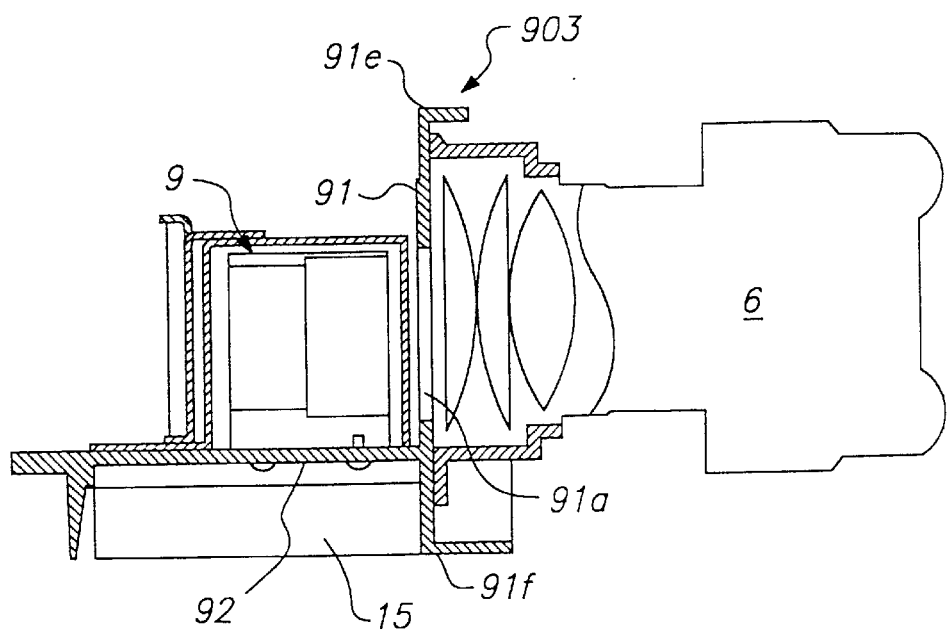

The following is a description of the shape of head plate 903 principally with reference to FIGS. 4A, 4B, and 6. Head plate 903 basically comprises a vertical wall 91, which extends in an upright orientation in the width direction of the equipment; and a bottom wall 92, which extends horizontally from the lower edge of vertical wall 91. As shown in FIG. 6, vertical wall 91 has a high degree of exterior-surface rigidity, in which a large number of reinforcing ribs 91a are formed vertically and horizontally on its surface. A rectangular opening 91b is formed at the center of the vertical wall to allow the passage of the light rays emitted by prism unit 910. Further, screw holes 91c for prism unit locking screws are formed on vertical wall 91. Also, screw holes 91d for fixing the board edge side of projection lens unit 6 are formed on the vertical wall. As indicated in FIG. 4B, the board edge side of projection lens unit 6 is fixed to the surface of the front side of vertical wall 91, and prism unit 910 is fixed to the surface of the rear side.

Thus, because prism unit 910 and projection lens unit 6 are fixed in condition in which they are aligned across the highly rigid vertical wall 91, the prism unit and the projection lens unit are highly integrated so that, even if subjected to impact, they are extremely unlikely to become dislodge from their relative positions.

A cooling fan 15 is attached to the back side of bottom wall 92 of head plate 903. Communication holes (not shown in the figure) are formed on bottom wall 92 to allow for the passage of cooling air.

As indicated in FIGS. 2B and 4A, attachment parts 91e and 91f for upper case 3 and lower case 4 are formed, at the upper edge and the lower edge, respectively, of vertical wall 91 of head plate 903. These parts are fixed to the sides of upper case 3 and lower case 4, respectively, by means of locking screws.

Thus, in this embodiment as described above, the rear edges of upper case 3 and lower case 4 are fixed to power supply unit 7, and the front edges are fixed to head plate 903. Because upper case 3 and lower case 4 are fixed to rigid components at the front and the back, the rigidity of these cases is enhanced. This improves the quality of shock resistance and minimizes any damage if the equipment should be dropped.

(Cooling Mechanism)

The compact organization of projection-type display apparatus 1 effected for ease of transport necessarily reduces the amount of interior space, thus limiting the size of the passageways through which cooling air flows. Further, although it is desirable to cover power supply unit 7 and other components with a shielding plate in order to reduce noise, covering them isolates the interior of power supply unit 7 from the other components. This could inhibit the flow of cooling air through the interior of power supply unit 7 and thus reduce cooling efficiency. Further, if the open air inlet for exterior case 2 is clogged, a sufficient amount of air cannot be introduced into the interior of the equipment, and may result in insufficient cooling.

To solve these problems and to provide a cooling mechanism that ensures efficient cooling of the components in the interior of the equipment, projection-type display apparatus 1 of the present embodiment adopts the constitution described below.

The cooling mechanism for projection-type display apparatus 1 of the present embodiment also contains a cooling air inlet 28 formed on equipment exterior case 2; a suction fan 15 that introduces air into the interior of the case; an air exhaust outlet formed on equipment exterior case 2 for discharging the air introduced into the interior of the case to the outside; and an exhaust fan 16 that discharges the interior air to the outside through the air exhaust outlet.

In the present embodiment, lamp housing 802 for light source lamp unit 8, which is a heat source, is designed in the following shape: an air vent for introducing the cooling air is formed on the front side in the direction of the optical axis; an exhaust outlet is formed on the backside in the direction of the optical axis; and the horizontal and vertical peripheries are substantially closed. The lamp housing is arranged in such a way that the suction side of said exhaust fan 16 is positioned at the back of said exhaust outlet that is formed on lamp housing 802.

In this way, at least part of the air flow that is introduced into the interior of the equipment from said suction fan 15 flows into the interior of the equipment along the optical axis from the side of said air vent at the front side of said lamp housing 802. The air then passes around light source lamp 801 placed inside said lamp housing 802, is drawn to the side of said exhaust fan 16 from said exhaust outlet formed on the rear side, and discharged to the outside. Thus, the flow of the cooling air into lamp housing 802 in the direction of the optical axis and along the periphery of the lamp housing ensures the efficient cooling of interior components such as lamp 805 and reflector 806.

In the present embodiment power supply unit 7, which is a heat source, adopts the structure wherein an auxiliary suction fan 17 for forcing cooling air into the interior of the power supply unit and an exhaust outlet that discharges the air introduced into the unit by auxiliary suction fan 17 are attached.

In this manner at least part of the air flow that is introduced into the interior of the equipment from said suction fan 15 is forced into the interior of said power supply unit 7 by said auxiliary suction fan 17. The air is then drawn to the side of said exhaust fan 16 through the interior of the unit and said exhaust outlet and discharged to the outside. Thus, even if power supply unit 7 is a closed space covered by shielding case 701 and other components, a sufficient amount of air is permitted to flow into the interior of the equipment, and the equipment is adequately cooled.

Further, in the present embodiment, said air inlet 28 is formed on the bottom wall of said exterior case 2, and said suction fan 15 is provided directly above the air inlet in order to create a cooling air flow in the upward direction. Also, a second suction inlet 24 is formed on the upper wall of exterior case 2 at a position corresponding to said suction fan 15. Said optical lens unit 9 is positioned between the second suction inlet 24 and said suction fan 15. An air-flow path is created in said optical lens unit 9. The air-flow path directs the air introduced from said second suction inlet 24 to the suction side of said suction fan 15, and guides the air blown from said suction fan 15 to the side of said second suction inlet 24.

Thus, even if the suction inlet 28 on the suction side of suction fan 15 is clogged, because the second suction inlet 24 is formed so that the air introduced from there is directed to the side of suction fan 15, a sufficient amount of air can be introduced from the second suction inlet 28. This ensures that the interior of the equipment is cooled sufficiently at all times.

In this case it is desirable to cover the periphery of the aforementioned suction fan with sealing plate 1150 in order to partition the system and form an air path that directs the air that has descended through the aforementioned air-flow path for the aforementioned optical lens unit to the suction side of said suction fan 17.

The following describes the specific cooling mechanism for the heat-generating components in projection-type display apparatus 1 of the present embodiment with reference to FIGS. 7, 8, 9, and 10.

Figure 8:
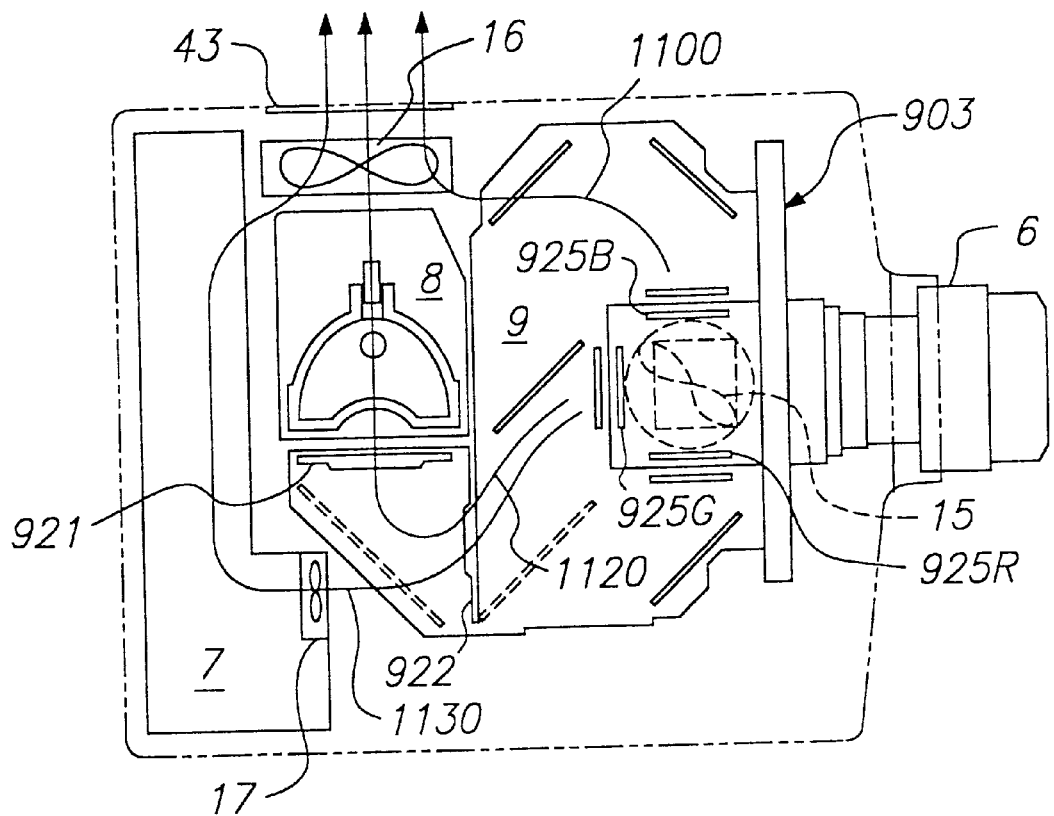
FIG. 8 explains the planar flow of cooling air.

The basic flow of cooling air in apparatus 1 of the present embodiment, on a plane, takes the path shown in FIG. 8. The air drawn, by cooling suction fan 15 from the outside through air vent 28 that is formed on bottom wall 4a of apparatus 1, passes through the interior of optical lens unit 9 and is discharged to the outside by exhaust fan 16 that is provided on the left side surface of the equipment. As indicated by the bold lines in FIG. 8, the principal air flow is as follows: part of air flow 1100, on a plane, passes through optical lens unit 9, reaches exhaust fan 16 in a straight line, and is discharged to the outside after passing through the exhaust fan.

Another air flow 1120 enters into the interior of the equipment from optical lens unit 9 and from the front side of light source lamp unit 8 through air vent 804a formed on outer housing 804 and through air vent 808 formed on inner housing 803. After passing through this area, the air passes through exhaust outlet 807 on the rear side and is discharged to the outside through exhaust fan 16 located on the back side.

On the other hand, another air flow 1130 is drawn in by auxiliary suction fan 17 attached to the edge of power supply unit 7 and pulled through to the interior of power supply unit 7. After passing through the interior of the power supply unit, the air is suctioned by exhaust fan 16 from the other edge and discharged to the outside.

Figure 9:
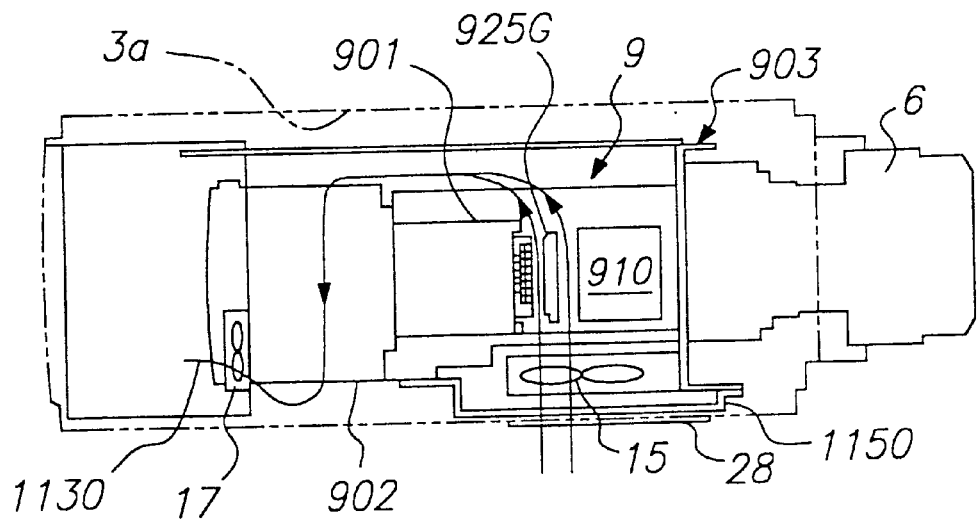
FIG. 9 explains the 3D flow of cooling air.

FIG. 9 shows the three-dimensional flow of air flow 1130 through the flow path, passing through the interior of power supply unit 7. As shown in the figure, after being drawn from the outside by suction fan 15, air flow 1130 is blown upwards along the incident and emission side surfaces of light valves 925R, G, and B of optical lens unit 9; it passes through the vent hole that is opened in upper light guide 901, enters into the space between the upper surface and the backside of upper wall 3a of the upper case, and flows in the horizontal direction through the space between these units. Then, the air passes through the vent hole opened in upper light guide 901, descends through the components of optical lens unit 9 in which integrator lenses 921 and 922, which are uniform-illumination optical devices, are provided, enters into the lower side of the vent hole that is opened in lower light guide 902, and then is introduced into the interior of power supply unit 7 through exhaust fan 17. After that, the air flows to the side of exhaust fan 16, from which it is discharged to the outside.

As described above, in this embodiment an auxiliary suction fan 17 is provided in order to force the introduction of a cooling air flow into the interior of power supply unit 7. This effectively cools the interior of power supply unit 7, which is a heat source.

FIG. 7 shows the three-dimensional flow of air flow 1120 that flows and passes through light source lamp unit 8. As shown in the figure, air flow 1120 flows along the space between upper light guide 901 and the back side of upper case upper wall 3a and reaches the upper front edge on the emission side of light source lamp unit 8. From there, the air flow flows along the surfaces of the constituent components of light source lamp unit 8 and reaches exhaust fan 16 on the back side. Thus, air flow 1120 flows along the inner and outer surfaces of outer housing 804 and along the inner and outer surfaces of inner housing 803. Further, it flows along the surface of reflector 806.

As indicated above, in this embodiment air flow 1120 is formed along the optical axis from the front edge to the back side of light source lamp unit 8, thus efficiently cooling the areas around heat sources such as lamp 805 and reflector 806.

Figure 10:
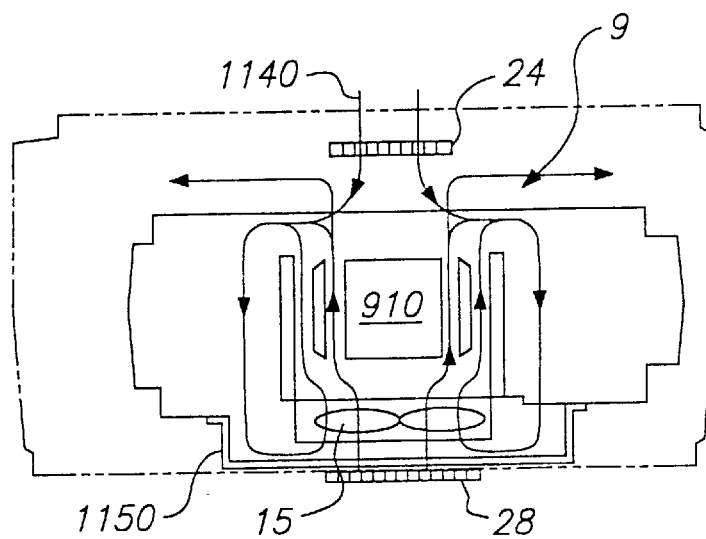
FIG. 10 explains the 3D flow of cooling air.

As indicated in FIGS. 9 and 10, in this embodiment vent hole 24 is formed on the side of upper wall 3a of the upper case. Consequently, even if filter 29, attached to vent hole 28 of suction fan 15, should become clogged and a sufficient amount of air cannot be introduced through the filter, air can still be introduced from upper-side vent hole 24 as follows: as shown in FIG. 10, if lower vent hole 28 is clogged, negative pressure prevails in the interior. This causes the air to be introduced from the upper vent hole 24 and creates the air flow shown by bold line 1140. This air flow 1140 is introduced from vent hole 24 and drawn to suction fan 15, by which it is again blown upwards. Some of this air flow becomes a circulation flow and circulates through suction fan 15. (Needless to say, such a circulation flow also occurs under normal circumstances even if the lower vent hole 28 is not clogged.) The remaining air flow flows and passes through various components as air flows 1110, 1120, and 1130, and is discharged to the outside from exhaust fan 16.

A sealing plate 1150 is attached to the area around suction fan 15 to ensure the efficient introduction of air from the upper vent hole 24 in the event of the clogging of the lower vent hole 28. Air vents are provided on sealing plate 1150, at the position corresponding to communication hole 24. The periphery of the sealing plate is bonded to the back sides of lower light guide 902 and the bottom wall 92 of the head plate. This ensures the efficient formation of the circulation flow shown in FIG. 10. Thus, the external air is introduced efficiently from the upper-side communication hole 24.

Thus, the provision of communication hole 24 in this embodiment ensures that the interior of the equipment can be cooled without impedance even when the communication hole 28 for introducing external air on the side of suction fan 15 is clogged. The attachment of sealing plate 1150 ensures that external air can be introduced efficiently from vent hole 24, which is at a distance from suction fan 15, even when the hole is clogged.

(Light Valve Position Alignment Mechanism)

The following describes the position alignment mechanism for liquid crystal light valves 925R, G, and B of the present embodiment with reference to FIGS. 4A and 5. Since the position alignment mechanisms for these three light valves are identical, it suffices to describe the position alignment mechanism of one light valve, 925R.

Light valve block 1200, to which light valve 925R is attached, is fixed to the upper surface of bottom wall 92 of head plate 903. The light valve block 1200 contains lower adjustment plate 1210, which is attached to bottom wall 92. A right-and-left pair of long holes 1211 and 1212 are formed on the lower adjustment plate 1210. These holes form an elongated shape in the direction of the light path. Through these holes the adjustment plate is fixed to the bottom wall 92 of the head plate by means of locking screws 1213 and 1214.

A focus adjustment plate 1220 is attached to the top surface of the lower adjustment plate 1210 in such a way that the focus adjustment plate is perpendicular to the light path. Focus adjustment plate 1220 is provided with a vertical wall 1221, a bottom wall 1222 that extends horizontally from the lower edge to the upstream of the light path, and a top wall 1223 that extends horizontally from the top edge to the downstream of the light path. A joggle 1224 is formed at the center of bottom wall 1222. The joggle is supported in a rotatable manner by lower adjustment plate 1210. Therefore, focus adjustment plate 1220 can be rotated to the right and left around the vertical line that passes through joggle 1224. Bottom wall 1222 is fixed to the side of lower adjustment plate 1210 by a pair of locking screws 1225. On the other hand, the upper wall 1223 of focusing plate 1220 is fixed to cover 910a that covers the top surface of prism unit 910 by means of locking screws 1226. The screw holes 1227 of screws 1226 are set so that they are larger than screws 1226. Therefore, by loosening screw 1226, one can move the position of focus adjustment plate 1220 back and forth or to the right and left to some extent. A notch 1228 is formed at the tip of upper wall 1223. Notches 910b are formed also at positions that are opposite notches 1228 at specified intervals. When focusing plate 1220 is attached, an insertion groove 1229, into which the blade of a slot screw driver can be inserted, between the notches. When the blade of a screw driver is inserted and turned into insertion groove 1229, the focus adjustment plate 1220 rotates, with respect to prism unit 910, around the vertical line centered on joggle 1224 and moves in the direction of the light path (in the back-and-forth direction).

Thus, a perpendicular adjustment plate 1230 is supported on the vertical wall 1221 of focusing plate 1220 that can be moved back and forth in the direction of the light path, such that the perpendicular adjustment plate is parallel to the vertical wall. In other words, perpendicular adjustment plate supporters are to formed at the top and bottom of vertical wall 1221. Perpendicular adjustment plate 1230 is held between these supporters. The lower edge of perpendicular adjustment plate 1230 is supported on the lower edge side of focusing plate 1220 through alignment spring 1231. The top edge is pressed downward by the pair of right and left alignment adjustment screws 1232 and 1233 that are attached to focusing plate 1220. Consequently, by adjusting the amount of screw turns on the pair of adjustment screws 1232 and 1233, one can move perpendicular adjustment plate 1230 up and down relative to focusing plate 1220.

A horizontal adjustment plate 1240, parallel to the perpendicular adjustment plate, is supported on perpendicular adjustment plate 1230. Horizontal adjustment plate 1240 is pressed by an alignment adjustment spring 1241 on either of its right or left sides. The other side is pressed by one alignment adjustment screw 1242.

Therefore, by adjusting the amount of screw turns on screw 1242, one can laterally move horizontal adjustment plate 1240 relative to perpendicular adjustment plate 1230. Light valve unit 1250, to which liquid crystal light valve 925R is attached, is fixed at the center of horizontal adjustment plate 1240.

After fixing light valve block 1200 of this constitution to head plate bottom wall 92, one can adjust lower adjustment plate 1210 back and forth in the direction of the light path and rotate focusing plate 1220 around the vertical line centered on joggle 1224. In this manner, one can easily determine the focusing position for light valve 925R, i.e., its position in the direction of the light path. Also, by moving perpendicular adjustment plate 1230 and horizontal adjustment plate 1240 up and down and right and left, one can adjust the alignment of light valve 925R.

In light valve block 1200 of the present embodiment, the three plates, focus adjustment plate 1220, perpendicular adjustment plate 1230, and horizontal adjustment plate 1240, are fixed by U-shaped adjustment plate locking screws 1260 at three locations: the right center, the left center, and the center at the top edge.

In contrast to the conventional case where these three plates are fixed by locking screws, this embodiment eliminates the need for loosening the locking screws for focusing purposes. Thus, the present embodiment offers the advantage in that one can adjust the equipment with locking spring 1260 attached. In the conventional case, fixing the three plates by fastening the locking screws after positioning the adjustment plates can cause the three plates to shift. The present embodiment, however, eliminates the necessity for such an operation. Therefore, there is no possibility of the three plates moving out of alignment after they are adjusted.

In order to ensure the complete integration of the three plates in this embodiment after position alignment, a bonding agent receptacle 1270 is provided at the top edge of the three plates. After the three plates are positionally aligned, one fills the bonding agent receptacle 1270 in order to fix the plates by means of an adhesive.

(Structure of the Height Adjustment Feet)

Figure 14:
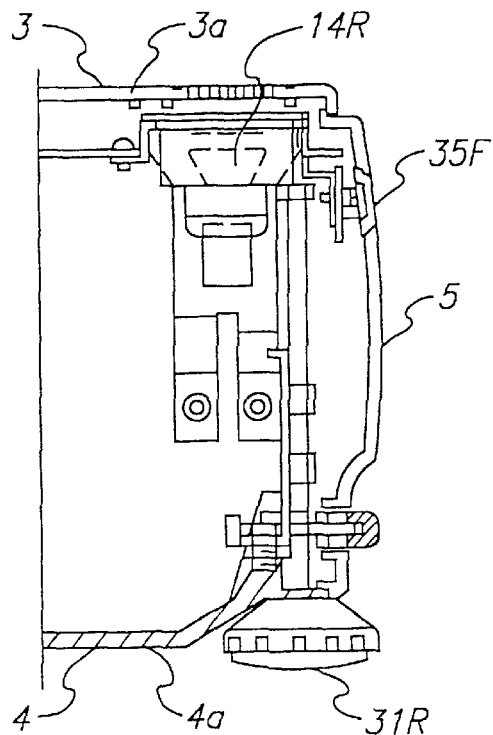
FIG. 14 is a partial cross-sectional diagram showing the structure of the height adjustment foot.
Figure 15:
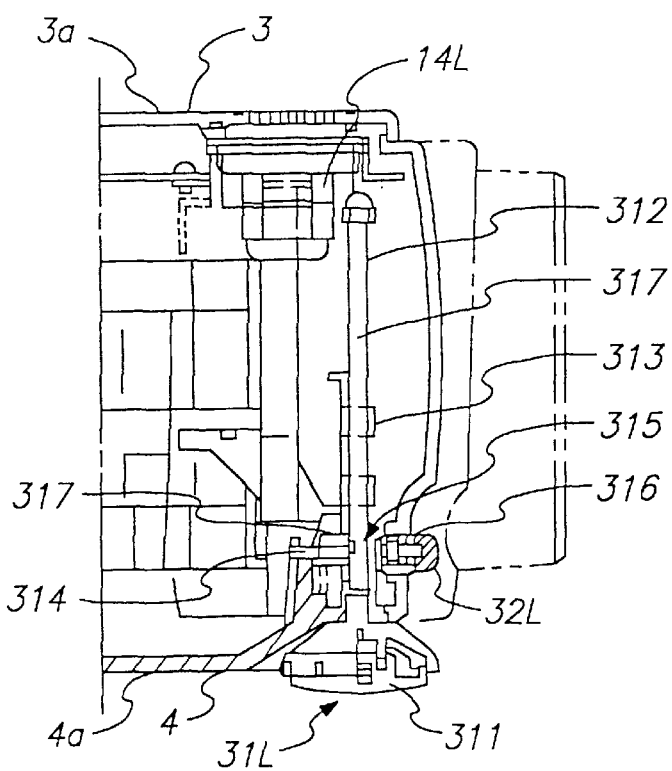
FIG. 15 is a partial cross-sectional diagram showing the structure of the height adjustment foot.

FIGS. 14 and 15 show height adjustment feet 31R and 31L, respectively. Because these feet have an identical shape and contain the same height adjustment mechanism, the following only describes one of them, foot 31L. Foot 31L contains a disc-shaped foot 3111, which exposes from the lower edge of front case 5 of the equipment; and a shaft 312, which extends from the top edge in a coaxial manner. Shaft 312 is supported in a vertical movable state by foot adjuster plate 313 which is fixed and supported by lower case 4. A male screw 317 is formed for almost the entire length of the shaft in the outer circumference of the shaft.

A plate-shaped foot stopper 314 is formed in an integrated manner on the backside of foot stopper button 32L that exposes forward from the lower edge of front case 5. A through hole 315, through which aforementioned shaft 312 penetrates, is formed in foot stopper 314. Further, foot stopper 314 is constantly pressed toward the front of the equipment by foot stopper spring 316. Therefore, button 32L on the front side of foot stopper 314 is maintained in a state in which it protrudes forward from front case 5. In this state, part of the inner circumference of through hole 315 of foot stopper 314 is pressed against the outer circumference of shaft 312 at a specified pressure. A female screw 318, which matches male screw 317 of the shaft, is formed on the inner circumference of the through hole.

The height adjustment foot 31L of this constitution is prevented by spring 316 from moving in the vertical direction. However, pressing button 32L in against the force of the spring dislodges foot stopper 314 from shaft 312. This enables foot 31L to move freely up and down along foot adjuster plate 313. Therefore, when one lifts the equipment with both hands and presses the right and left buttons, 32L and R, feet 31L and 31R will fall of their own accord. In this way, one can pull out the feet to a specified length. After that, one can fix the feet at the desired position by releasing buttons 32L and R with the feet pulled out to a specified length.

After that, rotating the feet causes shaft 312 to move vertically in small increments along screw 318 on the side of stopper 314. Therefore, after performing gross adjustments to the length of feet 31L and R by pressing buttons 32L and R, one can rotate the feet in order to perform microadjustments. Thus, in this embodiment, one can simply and quickly adjust the front-edge height of apparatus 1 and set apparatus 1 at the desired angle of inclination.

(Control Wheel Attachment Structure)

Figure 17A:
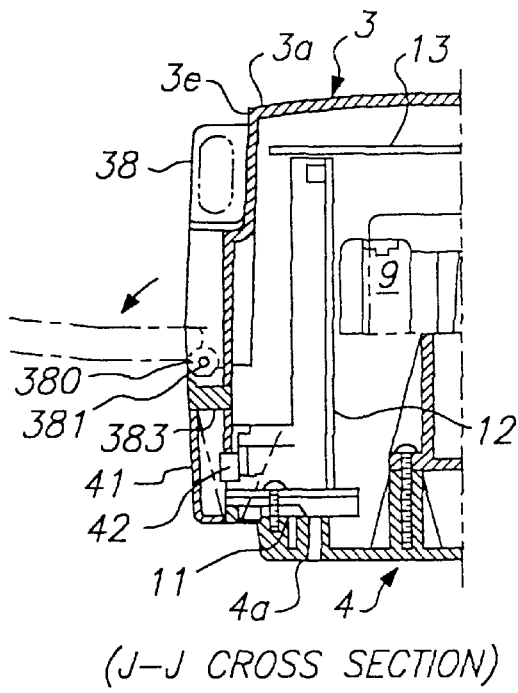
FIGS. 17A and 17B are partial cross-sectional diagrams that show the structure of the control wheel attachment part.
Figure 17B:
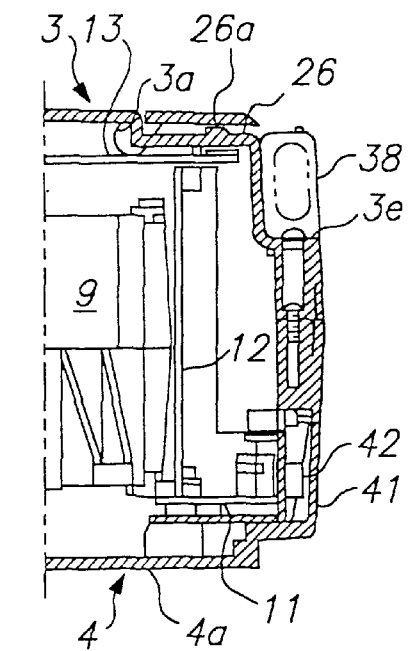

The following describes the attachment structure for control wheel 38 with reference to FIGS. 17A and 17B.

Control wheel 38 is housed in wheel-housing recess 3e formed on the side of apparatus 1. Control wheel 38 rotates around the pair of lower edges 38a and 38b and can be pulled out laterally. In this embodiment, the bearing for control wheel rotatory axis 381 is formed by combining upper case side wall 3b and lower case side wall 4b. A slightly protruding process 383 is formed on the circumference of lower edges 38a and 38b of the control wheel. By process 383, control wheel 38 is fixed with a prescribed restraining force at the housing position indicated by the solid line in FIG. 17A and at the withdrawing position indicated by the imaginary line.

(Control System)

Figure 25:
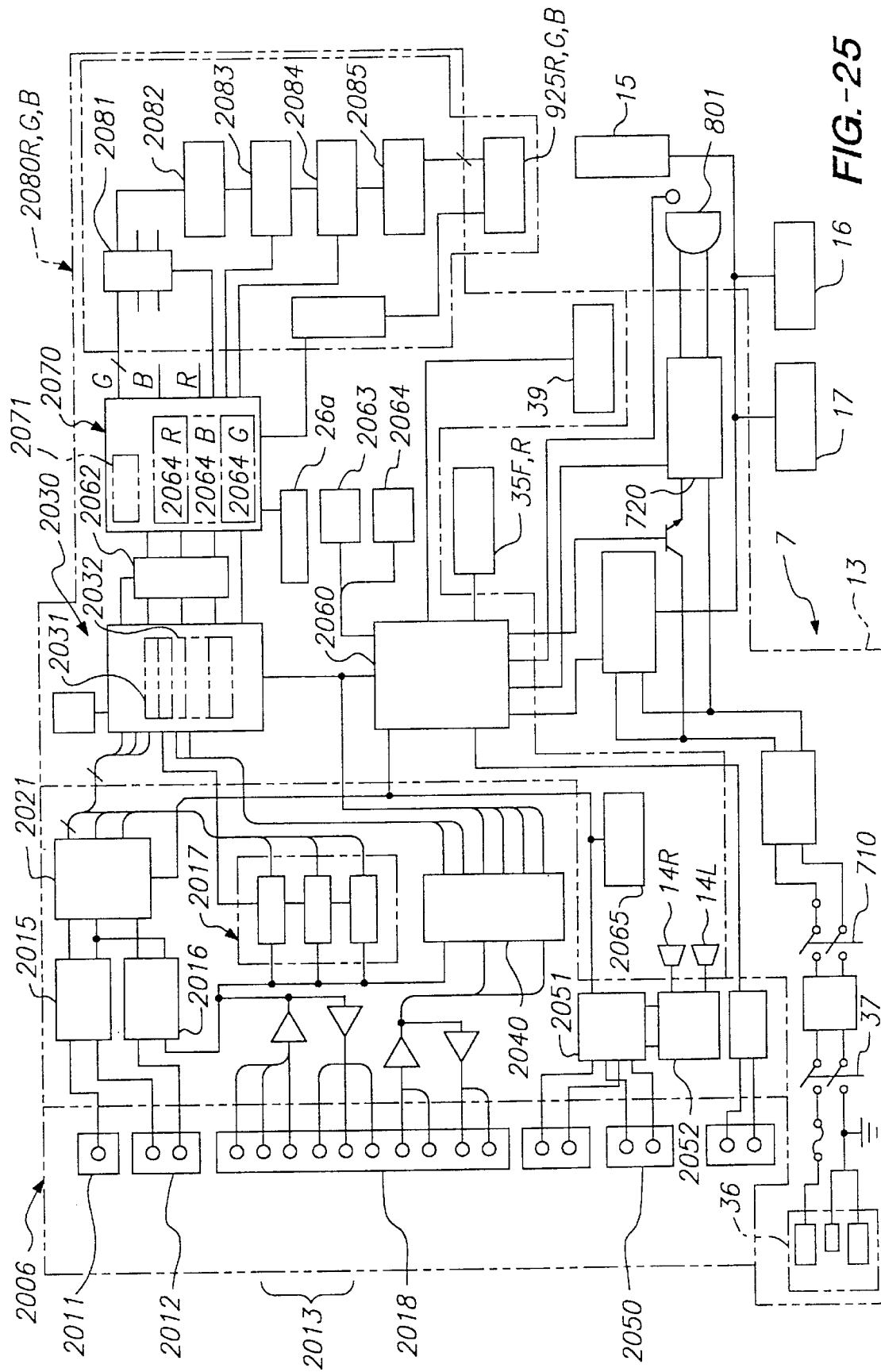
FIG. 25 is a schematic block diagram of the control system for the projection-type display apparatus of the present embodiment.

FIG. 25 shows a schematic block diagram of the control system for projectiontype display apparatus 1 of the present embodiment. As shown in the figure, video signals are input from the outside through the interface circuits that are formed on interface circuit board 11. The video signals received from video input terminal 2011, which is an ordinary video signal input terminal; input terminal 2012 for SVHF signals; and input terminal 2013 for computer output signals R, G, and B, are AD-converted by AD converters 2015, 2016, and 2017, respectively. After being AD-converted, the input video signals from video input terminals 2011 and 2012 are decoded by digital decoder 2012 and supplied to control block 2030, on which VRAM controller 2031 is mounted.

Digital decoder 2021 converts video signals into 8-bit video signals of R, G, B each and outputs the converted video signals to VRAM controller 2030. The digital decoder also outputs information on the signal format of the input video signals to micro controller 2060.

The R, G, B video input signals, after being AD-converted, are supplied to VRAM controller 2031. The vertical synchronization signal V and the horizontal synchronization signal H are supplied to synchronization signal-processing circuit 2040. Voice information is input from input terminal 2050 through volume 2051 and supplied to right and left speakers 14R and 14L through amplifier 2052.

Micro controller 2060 provides overall controls for the system; it determines whether or not the input video signals are computer input signals, based upon the signals from the synchronization signal-processing circuit and upon PC mode 2032 that is set in control block 2030. Micro controller 2060 also determines the format of input video signals based on test signal 2021S that is supplied by digital decoder 2021 and controls the write operation on VRAM 2062 by VRAM controller 2031. Micro controller 2060 also controls the write operations that are performed on liquid crystal light valves 925R, G, and B.

VRAM 2062 stores in memory the video signals expanded by VRAM controller 2031.

Gamma correction circuit 2071, mounted on control block 2070, reads digital gamma correction values from flash memory 2063 according to the format of the input video signals that are supplied by micro controller 2060 through bus interface 2033, and performs digital gamma correction on video signals. For each signal format, digital gamma conversion data is stored in flash memory 2063.

After being digital gamma-corrected, video information on colors R, G, and B is supplied, respectively, to drive circuits 2080R, G, and B for liquid crystal light valves 925R, 925G, and 925B. In each drive circuit, digital video signals are converted into analog signals through DA converter 2081, amplified by amplification/analog gamma correction circuit 2082, selectively and receive analog gamma correction. In the next step, analog video signals ire superimposed on the alternating drive voltage in alternating voltage superimposition circuit 2083, and converted into the alternating drive voltage form for driving the LCD. The result, when input into sample holder 2084, generates a 6-phase LCD drive voltage which is applied to the space between electrodes in the liquid crystal light valves through buffer 2085. This drives the pixel electrodes in the liquid crystal according to a given set of video signals.

It should be noted that SRAM 2064 is a work memory area, whereas EEPROM 2065 is memory that stores and retains adjustment data, such as userspecified color brightness.

(Method for Driving Liquid Crystal Light Valves)

The liquid crystal light valves 925R, 925G, and 925B used in the present embodiment are matrix-type display panels with in identical structure. Structurally they are identical to the liquid crystal light valves described in laid-open Japanese patent application S62-145218 and S62-254124 mentioned above.

It should be noted that the transmissivity of liquid crystal changes with the polarity of the applied voltage and can produce undesirable results such as flickers. Therefore, in the S62-254124 referred to above, R and B liquid crystal light valves are driven in the same polarity (e.g., "positive") and the remaining G liquid crystal light valve with the inverse structure is driven in reverse polarity (e.g., "negative"), in order to smooth out the fluctuations and thus control the flicker and other problems. Thus, as shown in FIG. 28, the polarity of the alternating drive voltage for pixels in video information fields is reversed in the light valves for R and B and those for G. The arrows in this figure show the selection drive direction for a given light valve.

This method, however, requires two different structures for three liquid crystal light valves. In view of this fact, the present embodiment employs the drive method described below in order to prevent any adverse effects due to fluctuations in transmissivity because of the polarity of alternating drive voltage even if the same structure is used for all three liquid crystal light valves.

In this embodiment, line buffers (FIFO) 2064R and 2064B for primary storage of video signals R and B are provided. The video information for one pixel line stored in these buffers is read in the order in which it is written and output to drive control storage of video signal G is read in such a way that the pixel information that was written last is read first, and the information is output to drive control circuits 2080G.

Figure 26:
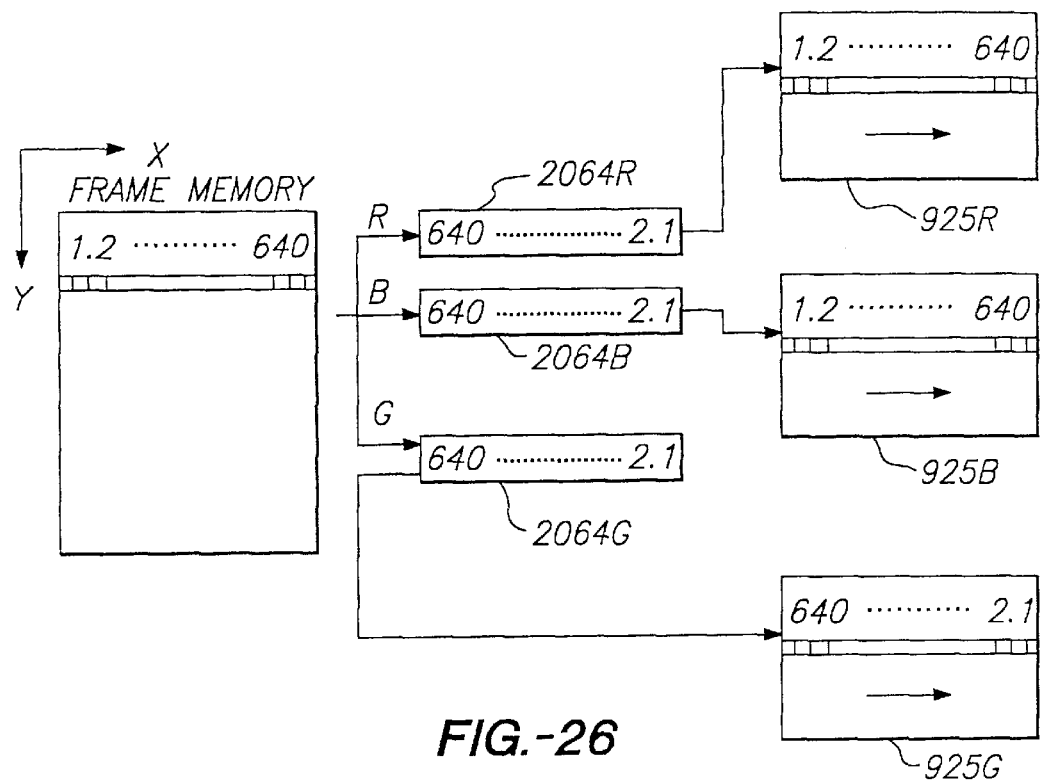
FIG. 26 explains how write operations on the liquid crystal light valves for different colors are controlled in the preferred embodiment.

FIG. 26 shows the way video information for one pixel line in light valves 925R, G, and B is written. As indicated in the figure, of one pixel line-worth of information for video information in either a frame or a field, R and B information is written via line buffers 2064R and 2064B in the pixel lines corresponding to liquid crystal valves 925R and 925B, and in the direction of the selection drive. By contrast, information for one G line is written through line buffer 2064G, beginning with the last information for the line, in the opposite direction of the selection drive. Thus, in liquid crystal light valve 925G, the direction of the selection drive remains the same but information is written with the right-to-left orientation reversed.

Specifically, of the light beams of various colors that have passed through liquid crystal light valves 925R, 925G, and 925B, the green light beam G passes through prism unit 910 and reaches projection lens unit 6, whereas the red light beam R and the blue light beam B reach projection lens unit 6 after being reflected at the right angle by the X-shaped reflecting surface of prism unit 910.

Therefore, after passing through prism unit 910, the red light beam R and the blue light beam B that have passed through liquid crystal light valves 925R and 925B undergo a right-to-left reversal of their optical images with respect to the green light beam G that has passed through liquid crystal light valve 925G.

However, as noted above, since in liquid crystal light valve 925R the information that is written undergoes a right-to-left reversal, after passing through prism unit 910 the light beams R, G, and B are correctly oriented in the right to left direction in their optical images.

Thus, by controlling the write operation on liquid crystal light valve 925G by means of the drive control means described above, the present embodiment is capable of dealing with the problem of the reversal of optical images that occurs when light beams pass through prism unit 910. Therefore, liquid crystal light valves of identical structures can be used for liquid crystal light valves 925R, 925G, and 925B.

Figure 27:
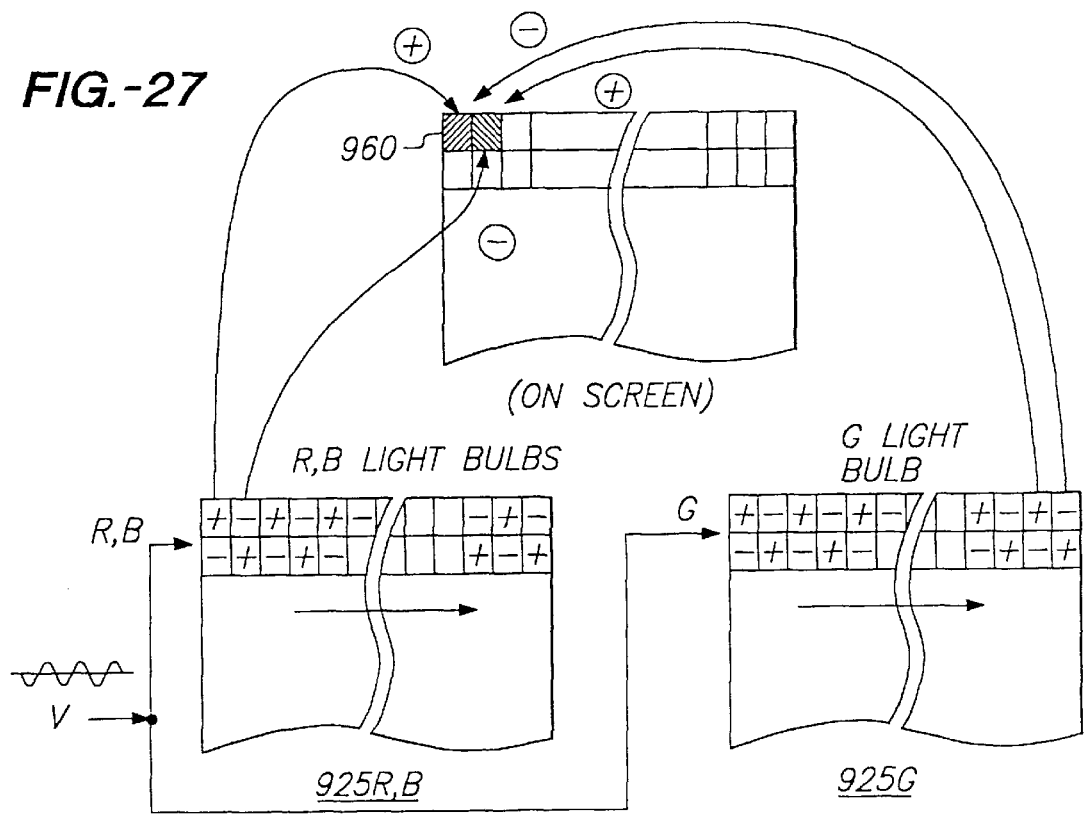
FIG. 27 shows the drive voltage polarities of pixels in the liquid crystal light valves for different colors.

Also, in this embodiment common panels are used as the three liquid crystal light valves as described above. Whereas the selection drives are oriented in the same direction, in the liquid crystal light valve G the video information that is written is reversed in the right-to-left direction. To deal with this problem, it suffices to make the drive voltages that drive the liquid crystal light valves alternating signals having the same phase. Specifically, as shown in FIG. 27, the light valves R and B and the light valve G operate so that the pixels corresponding to a given drive direction have the same polarity. When the light valves are driven in this manner, a correspondence exists in the video image that is formed on the screen between pixels in the condition in which the right and the left are reversed with the result that pixels of opposite polarities overlap.

For embodiment, as indicated by item 960 in FIG. 27, the negative pixels for the light valve G overlap the positive pixels of the light valves R and B. Therefore, by driving the liquid crystal light valves in this manner it is possible to suppress the flickers that are caused by fluctuations in transmissivity due to the polarity of the drive voltage.

In this regard, because the human eye is most sensitive to green, by reversing the polarity of the green color it is possible to reduce brightness differences efficiently between pixels.

(Method for Driving Liquid Crystal Light Valves for Data Compression)

On the other hand, in this embodiment the operation of writing video signals to liquid crystal light valve 925R, G, and B is varied according to the input video signal handling method employed as follows:

First, when RGB signals, which are computer-input signals, are entered, the following scheme is employed: in the video mode in which the number of vertical display lines is greater than 200, the full-line drive method is employed. In other words, as shown in FIG. 30A, a line of video signals is made to correspond one-to-one to one line of write signals that are written to a line of a liquid crystal light valve. In this embodiment the number of effective vertical display lines for the liquid crystal light valves of the present embodiment is 480. Therefore, in the video mode in which the number of display lines is less than 480, the non-display lines are processed as a black-level display.

Figure 30B:
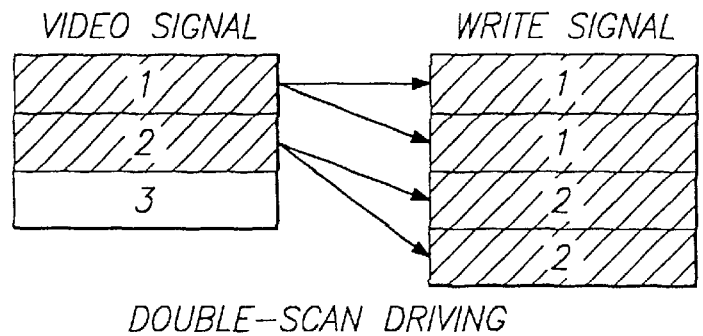

In the video mode in which the number of scanning lines is less than 200, however, the liquid crystal light valves are driven by the double-scanning drive method. In other words, as shown in FIG. 30B, each line signal for a video signal is written to two pixel lines in a liquid crystal light valve.

Figure 31A:
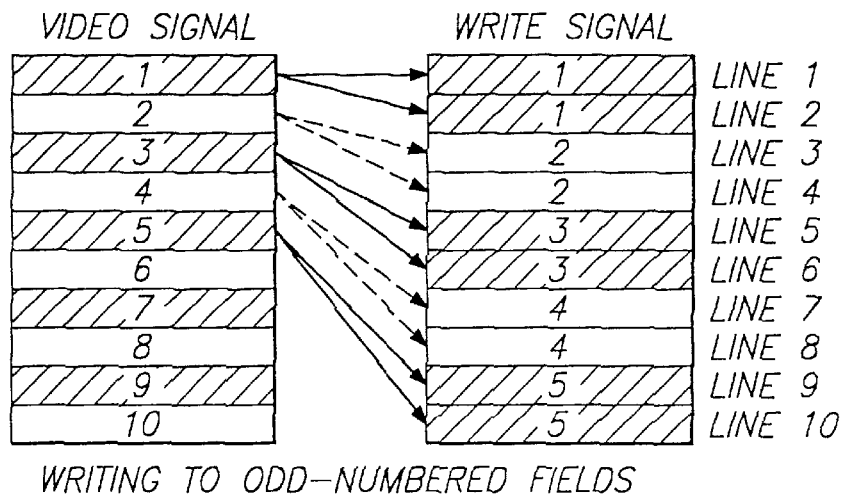
FIGS. 31A and 31B show how the process of writing NTSC-based video signals to a liquid crystal light valve is driven and controlled according to the preferred embodiment.
Figure 31B:
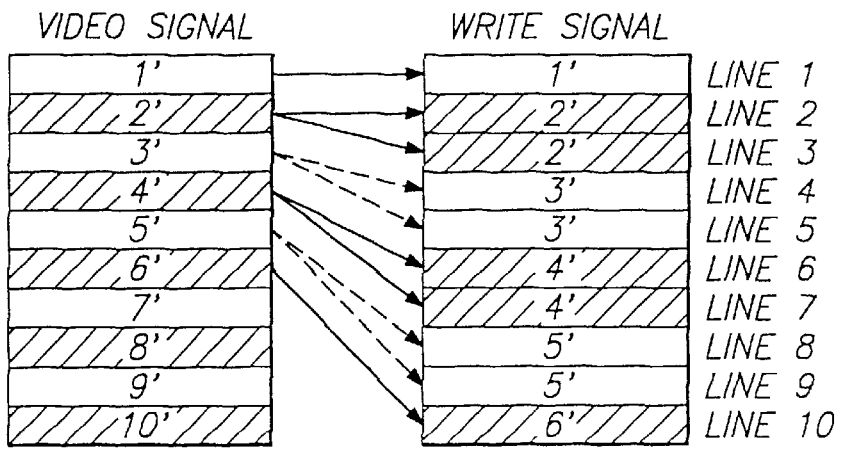

In the case where input signals are generated by the NTSC method, which is the TV broadcasting standard in Japan, one frame is composed of two odd-and-even fields, as is well known, such that the number of scanning lines per frame is 525. However, because the number of effective vertical display lines in the 525 scanning lines is approximately 480, in this embodiment liquid crystal light valves are driven by the half-line drive method in which one frame is composed only of one field of video signals. In addition, fields are displayed as follows:

First, as shown in FIG. 31A, for odd-numbered fields, write signals are generated so that the first video line is written to lines 1 and 2 of a liquid crystal light valve by double-speed conversion. Similarly, each video line is subsequently written to two adjacent lines of a liquid crystal light valve in double-speed (the linepair drive method). By contrast, for even-numbered fields, the first video line is directly written to one line of a liquid crystal light valve, as shown in FIG. 31B.

Similarly, each video line is subsequently written to two adjacent lines of a liquid crystal light valve by double-speed conversion.

Figure 32A:
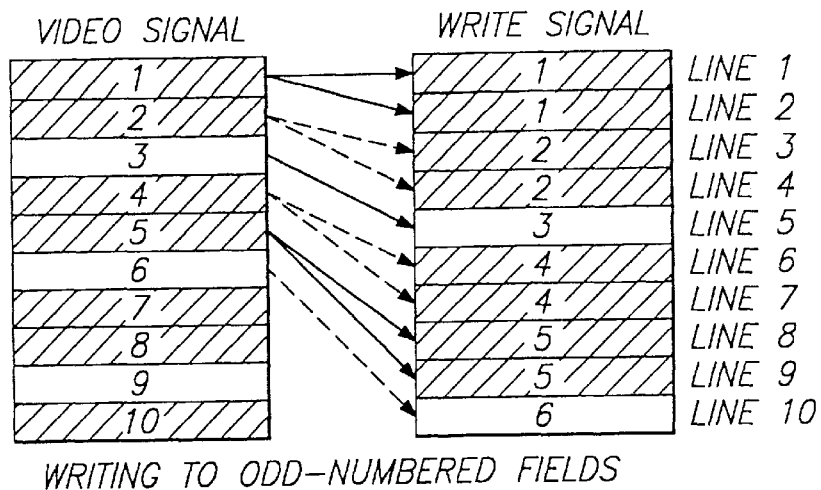
FIGS. 32A and 32B show how the process of writing PAL/SECAM-based video signals to a liquid crystal light valve is driven and controlled.
Figure 32B:
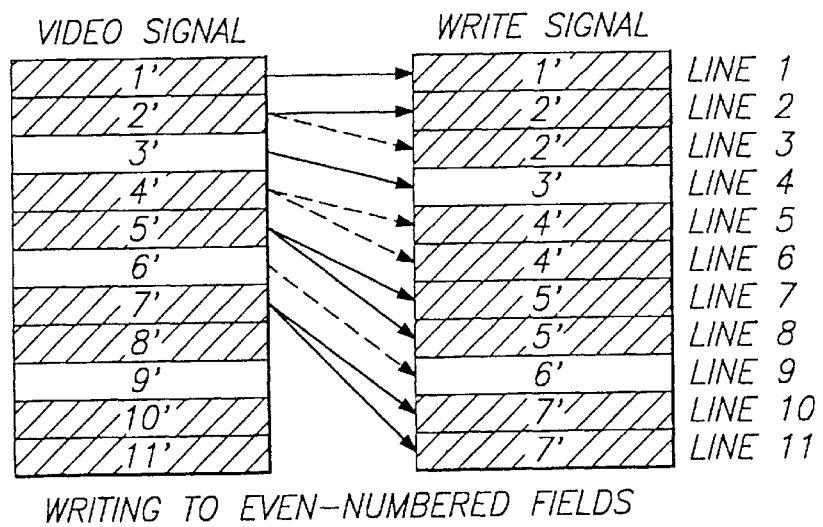

On the other hand, in the case of video signals generated by the PAL/SECAM method, the number of scanning lines per frame is 625. However, because the number of effective vertical display lines in the 625 scanning lines is approximately 600, in this embodiment liquid crystal light valves are driven by the half-line drive method as follows:

First, as shown in FIG. 32A, for odd-numbered fields, the first video line is written to lines 1 and 2 of a liquid crystal light valve by double-speed conversion. Similarly, the second video line is written to lines 3 and 4 of a liquid crystal light valve by double-speed conversion. The next line, the third video line, however, is written only to line 5 of a light valve. Subsequently, in a similar manner three video lines each are assigned and written to 2, 2, and 1 lines of the light valves (the modified line-pair drive method). By contrast, for even-numbered fields, the first video line is written to one line of a light valve, as shown in FIG. 32B, the second video line is written to lines 2 and 3 of the light valves by double-speed conversion, and the third video line is written only to line 4 of a light valve. Subsequently, three video lines each are assigned and written to lines 2, 2, and 1 of the light valves.

Thus, when displaying video signals generated by the PAL/SECAM method that requires a large number of scanning lines, the present embodiment writes one of the three video lines only to one line of a light valve without double-speed conversion. As a result, compared to the situation in which each video line is double-speed converted and written to a light valve, as in the case of the NTSC method, the video signals that are written to a light valve are compressed by a factor of five-sixths. In this embodiment, three video lines are assigned to light valves in 2, 2, and 1 lines each. Alternatively, the order of assignment can be either 2, 1, 2 or 1, 2, 2.

Figure 33:
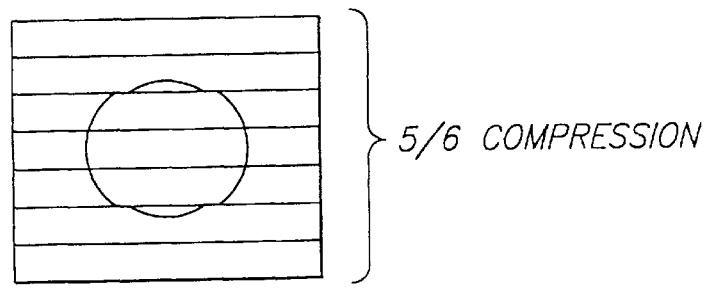
FIG. 33 shows an embodiment of the problems that result from a conventional video data compression control.

Conventionally, for displaying the video signals generated by the PAL/SECAM method, which requires a greater number of scanning lines than the NTSC method, a specified number of video signal lines are culled on a liquid crystal panel so that, overall, the data is compressed by a factor of five-sixths and so that the effective number of display lines will fit within the 480-line limit. In this method, however, the compression processing causes dropouts of some video signal lines. As a result, for embodiment, curved figures, such as a true circle, are rendered as discontinuous displays due to data compression. This is shown in FIG. 33.

However, the modified line pair drive method, which is the video signal processing method of the present embodiment, does not produce any missing video lines, thus avoiding the problem described above. Additionally, the modified line pair drive method does not require culling of video data for data compression purposes.

(Gamma Correction Method)

In this embodiment, mixed gamma corrections using both digital and analog methods are applied to the video signals that are input into liquid crystal light valves 925R, G, and B. Specifically, in gamma correction circuit 2071, digital gamma corrections are performed based upon the applied voltage-transmissivity (V-T) characteristics of liquid crystal light valves 925R, G, and B according to a conversion table for digital gamma correction values stored in flash memory 2063. In the next step, analog gamma corrections are applied to video signals, in a specified range, in amplification/analog gamma correction circuit 2082.

In this embodiment, a digital gamma correction is applied to the all video signals according to the V-T curve shown in FIG. 29. The correction is performed by dividing the applied voltage, whose transmissivity is from 0% to 100%, into 16 gray scale levels. After applying a digital gamma correction, three gray scale levels beginning with black, whose transmissivity is substantially zero, are approximated using curves by applying an analog gamma correction.

In other words, over three gray scale levels from black, whose transmissivity is zero, to white, the slope of the V-T curve changes rapidly, as shown in the figure. Consequently, applying a digital gamma correction to this portion requires a large amount of data. Because in this embodiment digital gamma corrections are performed using 256-bit data, a large amount of data can be assigned to this portion only at the expense of reducing the amount of data allocated to the other portions. This reduces the overall accuracy of gamma correction. Therefore, the same amount of correction data is assigned to the three gray scale levels beginning with black, which would otherwise require a large amount of data, as the other portions, so that digital corrections are applied to these three gray scale levels by approximation, and at later steps this portion is again subjected to an analog correction. In the analog correction process this portion is corrected by means of a curve approximation. Thus, this embodiment achieves an accurate gamma correction overall first by applying a digital gamma correction and then by applying a second analog correction on some video data.

In this embodiment, in addition, a conversion table is provided in flash memory 2063 for applying different digital gamma corrections according to the signal format of the input video signals to be treated. Moreover, the corresponding correction table is searched according to the type of input video signals to be treated. This permits the application of consistently appropriate gamma corrections for different forms of input video signals. It should be noted that, instead of storing gamma correction values according to input video signals beforehand in memory, correction values can be calculated using arithmetic operation circuits.

While the invention has been described in conjunction with several specific embodiments, it is evident to those skilled in the art that many further alternatives, modifications and variations will be apparent in, light of the foregoing description. Thus, the invention described herein is intended to embrace all such alternatives, modifications, applications and variations as may fall within the spirit and scope of the appended claims.

What is claimed is:

1. A method of assembling a dichroic prism comprised of four triangular prisms affixed to each other and X-shaped reflecting surfaces disposed along affixed surfaces of said four triangular prisms, comprising:

a step of affixing a first triangular prism and a third triangular prism to each other such that a first exposed surface is formed on a part of an affixed side of said first triangular prism;

a step for affixing a second triangular prism and a fourth triangular prism to each other such that a second exposed surface is formed on a part of an affixed side of said second triangular prism; and a step for affixing said first, second, third, and fourth triangular prisms to each other such that said first exposed surface and said second exposed surface are located in the same horizontal direction and a third exposed surface being orthogonal to said first and second exposed surfaces is formed between said first and said second triangular prisms.

2. The method of claim 1, further comprising a step of attaching at least one filter for absorbing light within a specified wavelength to at least, one exterior surface of said dichroic prism.

3. A method of assembling a prism unit comprised of a dichroic prism having four triangular prisms affixed to each other and X-shaped reflecting surfaces disposed along affixed surfaces of said four triangular prisms, and a fixation plate for fixing one end of said dichroic prism, comprising:

a step of assembling said dichroic prism having a step for affixing a first triangular prism and a third triangular prism to each other such that a first exposed surface is formed on a part of an affixed side of said first triangular prism, a step of affixing a second triangular prism and a fourth triangular prism to each other such that a second exposed surface is formed on a part of an affixed side of said second triangular prism, and a step of affixing said first, second, third, and fourth triangular prisms to each other such that said first exposed surface and said second exposed surface are located in the same horizontal direction and a third exposed surface being orthogonal to said first and second exposed surfaces is formed between said first and said second triangular prisms; and a step of affixing to one end of said dichroic prism said fixation plate having an uneven structure for fitting with bottom surfaces of said four prisms and said first, second and third exposed surfaces.

4. The method of claim 3, further comprising a step of attaching at least one filter for absorbing light within a specified wavelength to at least one exterior surface of said dichroic prism.

* * * * *

UNITED STATES PATENT AND TRADEMARK OFFICE
CERTIFICATE OF CORRECTION

PATENT NO. : 5,909,944
DATED : June 08, 1999
INVENTOR(S) : Akitaka Yajima, et al It is certified that errors appear in the above identified patent and that said Letters Patent is hereby corrected as shown below:

Title page, item 75, Inventors, delete "Motoyuki Fujimori; Mutsuya Furuhata; Tomiyoshi Ushiyama; Terunaga Koide; Toshiaki Hashizume; Kiyoshi Miyashita; Hiroshi Harima; Keijiro Naito, all of".

Column 27, line 18, delete "," after "least".

Signed and Sealed this

Twenty-eighth Day of December, 1999

Attest:

Q. TODD DICKINSON

*Attesting Officer*     *Acting Commissioner of Patents and Trademarks*